US010253835B2

(12) United States Patent
Wagner

(10) Patent No.: US 10,253,835 B2
(45) Date of Patent: Apr. 9, 2019

(54) BRAKE CALIPER WITH BRAKE PAD TIMING AND RETRACTION CONTROLLER WITH LOCK-CONNECTION

(71) Applicant: PERFORMANCE FRICTION CORPORATION, Clover, SC (US)

(72) Inventor: Mark Wagner, Weddington, NC (US)

(73) Assignee: PERFORMANCE FRICTION CORPORATION, Clover, SC (US)

(*) Notice: Subject to any disclaimer, the term of this patent is extended or adjusted under 35 U.S.C. 154(b) by 8 days.

(21) Appl. No.: 15/348,463

(22) Filed: Nov. 10, 2016

(65) Prior Publication Data
US 2017/0159734 A1 Jun. 8, 2017

Related U.S. Application Data

(60) Provisional application No. 62/253,499, filed on Nov. 10, 2015.

(51) Int. Cl.
*F16D 65/56* (2006.01)
*F16D 65/095* (2006.01)
(Continued)

(52) U.S. Cl.
CPC ....... *F16D 65/567* (2013.01); *F16D 65/0006* (2013.01); *F16D 65/095* (2013.01);
(Continued)

(58) Field of Classification Search
CPC .................... F16D 65/0006; F16D 65/567
See application file for complete search history.

(56) References Cited

U.S. PATENT DOCUMENTS 2,536,269 A   1/1951  Driscoll
2,551,251 A * 5/1951  Du Bois ............... F16D 65/54
                                                    188/71.8
(Continued)

FOREIGN PATENT DOCUMENTS

CA    2716423 A1   4/2011
CN    1239538 A    12/1999
(Continued)

OTHER PUBLICATIONS

European Search Report from European Application No. 10164195 dated Aug. 19, 2010.
(Continued)

*Primary Examiner* — Vishal R Sahni
(74) *Attorney, Agent, or Firm* — Roberts Mlotkowski Safran Cole & Calderon, P.C.

(57) ABSTRACT

A brake caliper is provided with a timing and retraction controller, a brake pad and a lock-connection comprising an engaging component and a locking component. The timing and retraction controller adjusts brake timing, eliminates parasitic brake losses and dampens out-of-plane vibration between the brake pad and rotor. The brake caliper includes a housing disposed over a brake rotor; first and second opposing brake pads extendably and retractably mounted on opposite sides of the caliper housing, brake pistons that extend and retract the brake pads into and out of frictional engagement with the rotor, and brake pad timing and retraction controllers disposed on opposite sides of the caliper housing. Each controller includes a Belleville spring or other resilient member with a short compression travel limited to between about 1.50 mm and 0.025 mm. The short stroke Belleville spring of each controller applies a hold-off force against the extension force of the brake pistons that slightly delays brake pad extension and slightly reduces brake pad clamping force against the rotor, thereby advantageously
(Continued)

providing a front wheel braking bias when applied to the rear wheels of a vehicle. The restorative force applied by the short stroke Belleville forcefully and uniformly retracts the brake pad from the rotor, eliminating parasitic brake losses, and dampening out-of-plane vibration between the brake pad and rotor.

6 Claims, 17 Drawing Sheets

(51) Int. Cl.
*F16D 65/54* (2006.01)
*F16D 65/00* (2006.01)
*F16D 127/02* (2012.01)
*F16D 55/00* (2006.01)
*F16D 65/02* (2006.01)
*F16D 127/06* (2012.01)

(52) U.S. Cl.
CPC ...... *F16D 65/54* (2013.01); *F16D 2055/0029* (2013.01); *F16D 2065/1396* (2013.01); *F16D 2127/02* (2013.01); *F16D 2127/06* (2013.01)

(56) References Cited

U.S. PATENT DOCUMENTS

| | | | | |
|---|---|---|---|---|
| 2,711,801 A * | 6/1955 | Super | ............. | F16D 65/08 16/257 |
| 2,830,680 A * | 4/1958 | Hawley | ............. | F16D 65/54 188/152 |
| 2,997,138 A | 8/1961 | Cagle | | |
| 3,243,017 A | 3/1966 | Kleinstuck | | |
| 3,403,755 A | 10/1968 | Barrett et al. | | |
| 3,532,190 A | 10/1970 | Palmer | | |
| 3,554,334 A | 1/1971 | Shimano et al. | | |
| 3,613,849 A | 10/1971 | Pape | | |
| 3,618,714 A | 11/1971 | Croswell | | |
| 3,730,306 A | 5/1973 | Rath | | |
| 4,042,072 A | 8/1977 | Baba | | |
| 4,050,548 A | 9/1977 | Margetts | | |
| 4,057,127 A | 11/1977 | Woodring | | |
| 4,191,677 A * | 3/1980 | Strand | ............. | C09J 163/00 411/903 |
| 4,345,674 A | 8/1982 | Vacval | | |
| 4,378,863 A | 4/1983 | Baum | | |
| 4,382,491 A | 5/1983 | Chun | | |
| 4,527,667 A * | 7/1985 | Courbot | ............. | F16D 55/2265 188/73.34 |
| 4,662,483 A * | 5/1987 | Boeck | ............. | F16D 55/226 188/72.3 |
| 4,712,654 A | 12/1987 | Temple et al. | | |
| 4,993,532 A | 2/1991 | Weiss et al. | | |
| 5,186,284 A | 2/1993 | Lamela et al. | | |
| 5,427,211 A | 6/1995 | Sulzer | | |
| 5,549,181 A | 8/1996 | Evans | | |
| 5,613,579 A * | 3/1997 | Moore | ............. | F16D 65/04 188/211 |
| 6,305,506 B1 | 10/2001 | Shirai et al. | | |
| 6,378,665 B1 | 4/2002 | McCormick et al. | | |
| 6,394,236 B1 | 5/2002 | Matsuishita | | |
| 6,397,983 B1 | 6/2002 | Roszman et al. | | |
| 6,766,886 B2 | 7/2004 | Bendtsen et al. | | |
| 8,037,979 B2 | 10/2011 | Strandberg et al. | | |
| 2004/0195056 A1 | 10/2004 | Ashman et al. | | |
| 2009/0071765 A1 | 3/2009 | Strandberg et al. | | |
| 2011/0094834 A1* | 4/2011 | Burgoon | ............. | F16D 65/54 188/72.3 |
| 2011/0266099 A1 | 11/2011 | Knowles, Jr. | | |
| 2012/0063863 A1* | 3/2012 | Campau | ............. | F16B 39/20 411/317 |

FOREIGN PATENT DOCUMENTS

| | | |
|---|---|---|
| CN | 1314284 A | 9/2001 |
| CN | 20101519917 A | 11/2011 |
| DE | 4304616 A1 | 8/1994 |
| EP | 2314895 A1 | 4/2011 |
| GB | 840392 A | 7/1960 |
| GB | 1495701 A | 12/1977 |
| GB | 1600998 A | 10/1981 |
| JP | S4729078 U | 12/1972 |
| JP | S4733584 U | 12/1972 |
| JP | S5757932 A | 4/1973 |
| JP | S51-21786 | 5/1974 |
| JP | S5089767 A | 7/1975 |
| JP | S5656941 U | 5/1981 |
| JP | S56148128 U | 11/1981 |
| JP | S5744230 U | 3/1982 |
| JP | S4825490 B1 | 4/1982 |
| JP | S64-35226 | 3/1989 |
| JP | H01178241 U | 12/1989 |
| JP | H0669460 U | 9/1994 |
| JP | 2000088014 A | 3/2000 |
| JP | 2011122717 A | 6/2011 |
| KR | 1020050120468 A | 12/2005 |

OTHER PUBLICATIONS

International Search Report & Written Opinion issued in PCT/US2016/061309, dated Feb. 17, 2017.

* cited by examiner

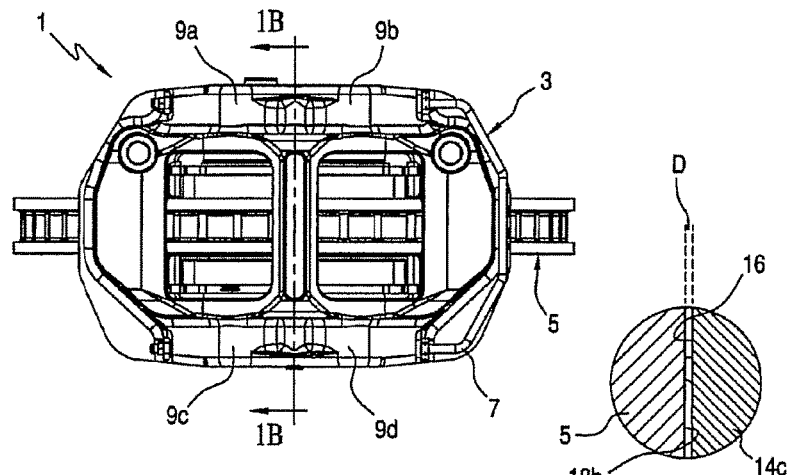
FIG. 1A
FIG. 2B
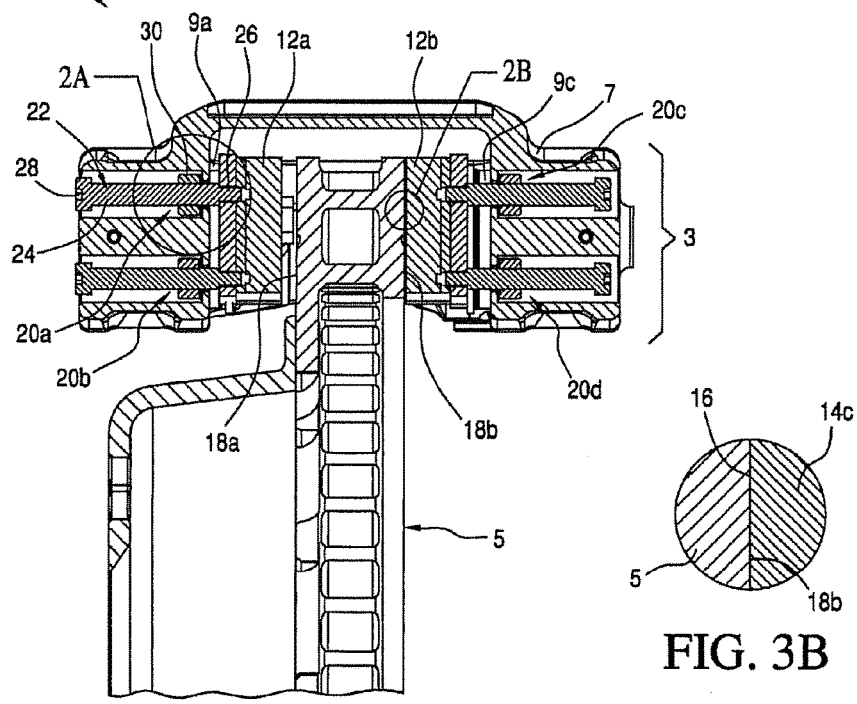
FIG. 1B
FIG. 3B

BRAKE CALIPER WITH BRAKE PAD TIMING AND RETRACTION CONTROLLER WITH LOCK-CONNECTION

RELATED APPLICATION

This application claims priority to U.S. Provisional Application No. 62/253,499, filed on Nov. 10, 2015, the contents of which are hereby incorporated by reference in their entirety.

Field

The teachings herein generally relate to brake calipers, and is specifically concerned with a brake caliper having a brake pad timing and retraction controller that both adjustably delays and negatively biases brake pad extension force when the brake pedal is depressed and forces positive and uniform retraction of the brake pad when the brake pedal is released.

Environment

Brake calipers for automotive disc brakes are well known in the prior art. In typical disc brake assemblies, a rotor is mounted on a wheel hub for rotation. One or more pairs of brake pads, generally designed as friction material carried on a backing plate, are supported on either side of the rotor by a caliper or an anchor bracket. Calipers are designed to apply the braking force by moving a piston relative to the rotor to move the brake pad into and out of contact with the rotor. The pistons are supported in a bore in the caliper and abut the backing plate of the brake pad to move the brake pad toward the rotor upon application of a braking pressure. The pistons are connected to elastomeric seal sleeves which normally withdraw the pistons, and hence the brake pad, into a non-engaging position with respect to the rotor. In operation, when the brake pedal is depressed by the vehicle operator, actuation force is generated hydraulically or mechanically. In a hydraulic system pressure is generated in the master cylinder or by a pump of the brake system, which conducts pressurized hydraulic fluid to the pistons in the caliper. The pressure of the hydraulic fluid against the ends of the pistons overcomes the withdrawing force that the elastomeric seal sleeves apply to the pistons, causing them to extend and to engage the brake pad against the rotor, thereby applying a braking force to the wheels of the vehicle. When the vehicle operator releases the brake pedal, the restorative force applied to the piston by the elastomeric sleeves causes them to withdraw. The brake pads, which are typically not connected to the pistons, then float back from and out of engagement with the rotor. In lieu of pistons, such actuation and withdrawal of the brake may also be accomplished non-hydraulically through a series of levers, cams, and or wedges.

During a braking operation, it is important that the braking forces applied by all four wheels of the vehicle be coordinated in order to maximize not only the braking of the vehicle, but the control of the vehicle during braking. The applicants have observed that maximum control of some vehicles during braking can best be maintained if the front brakes operate slightly before the rear brakes operate. Unfortunately, even though most vehicle braking systems are designed to apply a greater amount of front tire braking force than rear tire braking force, the applicants have observed that the structure of most master cylinders and brake calipers tends to actuate the rear brakes slightly ahead of the front brakes. Such operation compromises control of the vehicle during the transition period between the application of primarily back-wheel brake forces and primarily front-wheel brake forces. Moreover, it is also important that the brake pads quickly and positively disengage the rotor throughout the entire surface of the pad when the operator releases the brake pedal. Otherwise, parasitic braking can occur which lowers fuel efficiency and accelerates wear on the brake pads.

SUMMARY

Accordingly, there is a need for a brake caliper having a brake pad timing and retraction controller that can easily and reliably adjust the timing and clamping force of the brake pad extension when the brake pedal is depressed, and that can positively and uniformly retract the brake pad from the rotor when the brake pad is released. To this end, the brake caliper of the invention comprises a caliper housing, a brake pad having a braking surface that selectively engages a brake rotor, at least one reacting member such a hydraulic piston mounted in the housing that extends and retracts the brake pad into and out of frictional engagement with said rotor; and a brake pad timing and retraction controller including at least one resilient member with limited compression travel.

The brake pad timing and retraction controller biases against extension by applying an adjustable hold-off force against an extension force applied to said brake pad by the reacting member that momentarily delays extension and slightly reduces the resulting clamping force between the brake pad and the rotor. The controller also forces positive and uniform retraction of the brake pad from the rotor, thereby minimizing parasitic braking. Additionally, the controller positively retracts the brake pad from the rotor a consistent distance throughout the wear life of the brake pad and rotor, rendering the mechanism self-adjusting. The controller also damps out-of-plane vibration between the brake pad and rotor. Advantageously, the use of separate controllers on opposing brake pads in an opposing brake caliper results in the application of independent pull back forces on the pads, thereby insuring that both pads will be positively and uniformly retracted out of engagement with the rotor.

The brake pad timing and retraction controller includes a bolt having a shaft that includes an end prepared for attachment to the brake pad which may be a threaded end. The threaded end is connected to the brake pad, and the shaft is movably mounted with respect to the housing. The controller also includes a caliper retraction collar frictionally engaged but slidably movable on the bolt shaft and spaced apart from the threaded end, and the caliper housing includes first and second telescoping bores slightly larger than the bolt shaft and the collar, respectively, for slidably receiving the threaded end and the piston retraction collar. The resilient member is captured between the caliper retraction collar and the annular interface between the first and second counter bores. The frictional engagement between the collar and bolt shaft is sufficient to prevent the collar from sliding on said shaft in response to the spring force of the resilient member when the resilient member is completely compressed. However, the frictional engagement between the collar and bolt shaft is insufficient to prevent the collar from sliding on the shaft in response to the extension force applied to the brake pad by the reacting member. Consequently, the wearing down of the pad will cause the reacting member to incrementally slide the collar along the bolt shaft the same distance as the reduction in thickness of the pad due to wear.

Such a structure advantageously allows the brake caliper to be self-adjusting in response to brake pad wear, thereby maintaining a constant-distance brake stroke throughout the life of the brake pad.

The stroke length of the resilient member is adjustable and may be between about 2.0 mm and 0.025 mm, and is preferably between about 0.30 mm and 0.050 mm. The resilient member is preferably formed from a Belleville spring, although a disc spring, certain types of leaf springs or a sheet of elastomeric material may also be used. The resilient member may include a plurality of Belleville springs. While the stroke length may be adjusted by selecting a stack of Belleville springs with the proper spring properties, it is preferable to adjust the stroke length by varying the profile of the spring-engaging side of the collar. As either end of the collar may be used to engage the spring, and as the cylindrical shape of the collar renders it reversible, the collar has two potentially spring-engaging surfaces. One of these surfaces may be provided with a flat profile to maximize the stroke length of the resilient member, while the other of these surfaces may have (in the case where the resilient element is a Belleville spring) a chamfered, dish-shaped profile that is partially complementary in shape to the resilient element in order to shorten the stroke length of the resilient member. Such a structure advantageously allows the stroke length of the resilient member used in the brake pad timing and retraction controller to be easily varied by reversing the orientation of the collar on the bolt shaft. Alternatively, stroke length may also be controlled by machining a shape into the annular interface that captures the spring which is complementary at least in part to the shape of the spring, or by providing a spacer between the annular interface and the spring.

The brake caliper of the invention may be used in combination with a brake of an automotive vehicle. The spring force of the resilient member is preferably selected to create a momentary delay and a hold-off force against the extension force of the reacting member that results in a slight relative reduction in brake clamping force between the operation of, for example, the rear brakes and the front brakes. Accordingly, the invention may be used to provide front brake bias during the entire braking operation, thereby maximizing control of the vehicle during the braking operation. Such a desired momentary delay and slight reduction in clamping force of the rear brakes verses the front brakes may be accomplished by applying the caliper of the invention to the rear brakes only, but is more preferably accomplished by applying the caliper of the invention to the brakes of both the front and rear wheels, with the spring properties (i.e. travel distance or spring force) of the resilient member being different between the rear brake calipers and the front brake calipers in response to the actuation forces applied by the reacting members. Alternatively, left wheel-right wheel brake timing biases may also be implemented by the invention, which may be useful in certain race car driving applications.

It is observed that the restorative force of the resilient member used in the brake pad timing and retraction controller not only advantageously adjusts brake timing, but also substantially increases the effective miles obtained per gallon of fuel and reduces brake wear due to a substantial decrease in parasitic braking. It is observed that the resiliency provided by the resilient member used in the brake pad timing and retraction controller also damps out-of-plane vibration between the brake pad and rotor, thereby reducing brake squeal.

In addition, it is desirous to provide the brake pad timing and reaction controller with a connection lock between a shaft of the controller and the brake pad to provide a locking force that is sufficient and counteractive against the effects of vibration, heat and torques typically imposed upon the connection during a braking action, especially those effects tending to rotate components of the connection out of a full and secure engagement.

In accordance with the teachings herein, there is provided a novel brake pad useable with a brake pad retraction system, wherein the brake pad comprises a frictional material affixed to a backing plate and the backing plate comprising a locking connection operative between the brake pad and an end portion of a controller shaft. The aforementioned locking connection comprises an engaging component operative to establish an alignment of the shaft with respect to the brake pad and a locking component operative to lock the shaft in the alignment, whereby the locking connection is counteractive to vibration, heat and/or torque arising from braking operation.

In an exemplary embodiment, in regard to the aforementioned brake pad, the locking connection further comprises a bore in the backing plate with a first threading, the bore being adapted to receive the end portion of a controller shaft. The engaging component comprises a leading zone of threading on the shaft end portion matching the first bore threading, the locking component comprising a trailing zone of lock threading on the end portion of a controller shaft. Alternatively, the engaging component comprises a leading zone of threading along the bore matching the threading the shaft end portion, the locking component comprises a zone of lock threading along the bore.

In another exemplary embodiment, the locking connection comprises a bore in the backing plate, the bore being adapted to receive a flanged binding post having a threaded bore. The threaded bore is adapted to threadingly receive the end portion of a controller shaft whereby a flange portion of the flanged binding post is brought into contact with a backside of the backing plate. In this embodiment the engaging component comprises the threaded bore of flanged binding post and the locking component comprising a tightening of the flanged portion against the backside of the backing plate.

In another exemplary embodiment, the engaging portion comprises a fit between a bore provide in the backing plate and the shaft end portion, and the locking component comprises a lock screw. The aforementioned fit may comprise at least one of a friction fit, and a threaded fit.

In yet another exemplary embodiment, the engaging portion comprises a fit between a bore provide in the backing plate and the shaft end portion and the locking component comprises a retaining ring. The retaining ring may be retained in an annular recess provided in the bore in the backing plate or retained in an annular recess provided on the shaft end portion.

In an exemplary embodiment, the engaging portion comprises a fit between a bore provide in the backing plate and the shaft end portion and the locking component comprises a slot and a key operative along at least a portion of the bore, the key being movable into a transverse direction into a locking relationship between the shaft end portion and the backing plate. The slot may be provided along the bore in the backing plate or the key may be provided at a location along the bore in the backing plate.

In an exemplary embodiment, the engaging portion comprises a fit between a bore provided in the backing plate and the shaft end portion, and the locking component comprises a release pin operative at a location along the bore.

In an exemplary embodiment, the engaging component comprises an initial friction fit between a bore provided in the backing plate and the shaft end portion, whereby a desired alignment of the controller shaft is achieved, and the locking component comprises a press fit established with the aligned controller shaft. The engaging component may further comprises contact between a rim of the bore in the backing plate and a shoulder at a trailing location along the shaft end portion.

In another, exemplary embodiment, the engaging portion comprises a fit between a bore provide in the backing plate and the shaft end portion, and the locking component comprises a locking wire. The aforementioned fit may be a threaded fit. The controller shaft may include a transverse channel adjacent the shaft end portion and the backing plate may include a second bore adjacent the bore, with the locking wire being extended through the channel and the second bore. The locking wire may include a wound portion which establishes a tension in the locking wire. The locking wire may be disposed about the shaft at the transverse channel so that the tension in the wire is in a direction of a tightening of the threaded fit.

The teachings herein also provide a novel brake assembly comprising a brake pad, a break pad timing and retraction controller comprising a shaft having an end portion, and a locking connection operative between the brake pad and the end portion of the controller shaft. The locking connection comprises an engaging component operative to establish an alignment of the shaft with the brake pad and a locking component operative to lock the shaft in the alignment, whereby the locking connection is counteractive to vibration, heat and/or torque arising from braking operation.

The summaries of the various embodiments previously set forth with regard to the brake pad are equally applicable to the above described brake assembly.

The teachings herein also provide a novel brake caliper comprising a brake pad, a housing having a rim portion and a brake pad timing and retraction controller. The aforementioned controller comprises a shaft having an end portion connected with a receiver of the brake pad, a resilient member on the shaft and spaced from a housing rim portion by a ring, a caliper retracting collar on the shaft and moveable toward the ring against the resilient member, wherein the caliper retraction collar has a frictional engagement with the shaft so as to be slidably movable on the shaft. The frictional engagement is sufficient for the caliper retraction collar to displace the resilient member upon movement of the caliper retracting collar with the shaft against the spring. The housing rim portion and the ring establishing a stop with respect to displacement of the resilient member by movement of the caliper retraction collar with the shaft, such that upon extension of the brake pad, the shaft and the caliper retracting collar move to displace the resilient member to the stop and thereupon, the shaft is further moveable with the brake pad relative to the spring and the ring. The ring may comprise a first ring and a second ring, having mutually engaged, complementary, frusto-conical surfaces which establish a concentricity of at least one of the first and second rings with respect to the shaft.

The first ring maybe disposed adjacent the resilient member and be slidingly engaged with the shaft. The first ring may include an annular surface adjacent the resilient member which may be orthogonal to the shaft or conical. The second ring may be located between the first ring and the housing rim and disposed about the shaft with clearance.

The first and second rings are configured to alleviate loadings on the controller shaft when the controller shaft is angularly shifted.

BRIEF DESCRIPTION OF THE SEVERAL DRAWINGS

The embodiments will now be described in more detail with reference to preferred forms of the embodiments, given only by way of example, and with reference to the accompanying drawings, in which:

FIG. 1A is a plan view of the inventive brake caliper in combination with a rotor;

FIG. 1B is a side, cross-sectional view of the caliper and rotor illustrated in FIG. 1A along the line 1B-1B;

FIG. 2B is an enlargement of the circled area in FIG. 1B labeled "2B", illustrating the brake pad and rotor in a separated state corresponding to an unactuated state of the brake pad timing and retraction controller;

FIG. 3B is an enlargement of the circled area in FIG. 1B labeled "2B", illustrating the brake pad and rotor in an engaged state corresponding to an actuated state of the brake pad timing and retraction controller;

DETAILED DESCRIPTION OF THE PREFERRED EMBODIMENTS

Figure 2A:
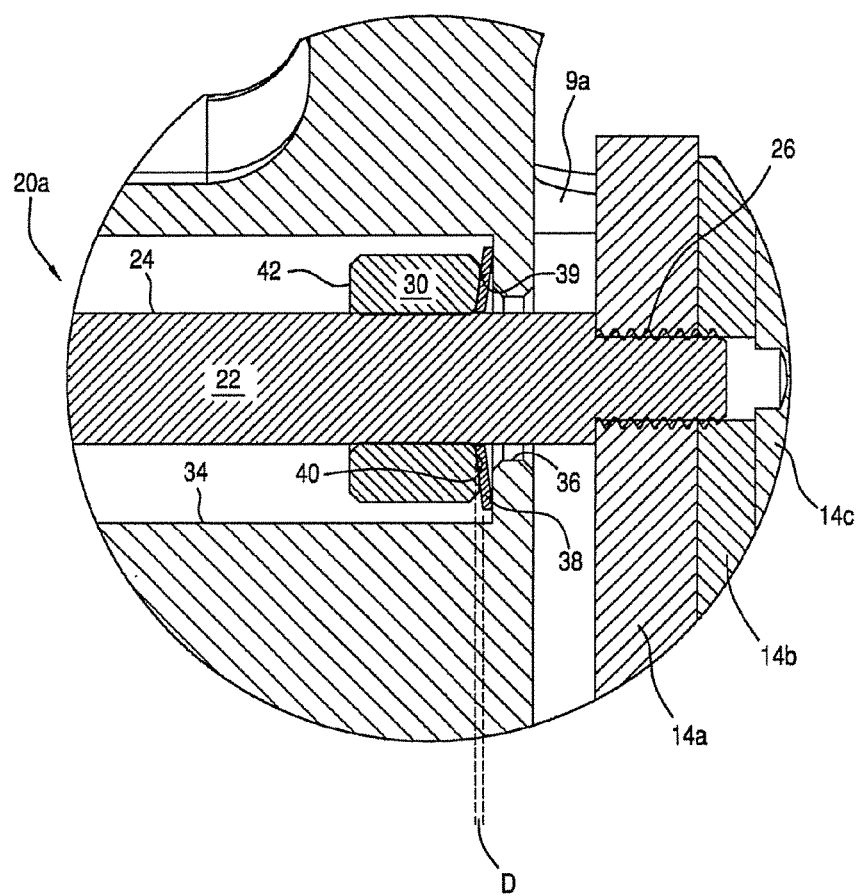
FIG. 2A is an enlargement of the of the circled area in FIG. 1B labeled "2A", illustrating the principal components of the brake pad timing and retraction controller incorporated within the caliper in an unactuated state.
Figure 3A:
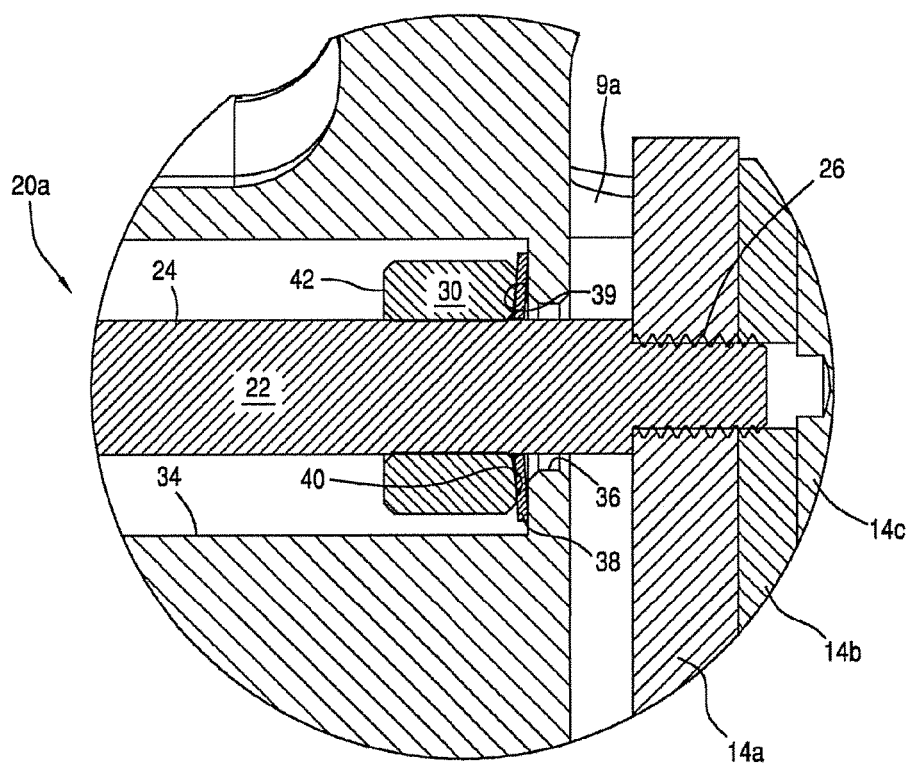
FIG. 3A is an enlargement of the of the circled area in FIG. 1B labeled "2A", illustrating the principal components of the brake pad timing and retraction controller of the invention in an actuated state with an unworn brake pad.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-17, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

FIGS. 1A and 1B illustrate a brake assembly 1 including the brake caliper 3 of the invention in combination with a rotor 5 attached to a wheel hub (not shown) which may be the wheel hub of an automotive vehicle. In this exemplary embodiment, the brake caliper 3 includes a housing 7 in which two pairs of opposing hydraulic caliper pistons 9a, 9b and 9c, 9d are slidably mounted within cylinders (not shown). Opposing brake pads 12a, 12b (FIG. 2A) each include a backing plate 14a, and an underlayer 14b that secures a layer of pad material 14c to the backing plate 14a. Opposing brake pads 12a, 12b are mounted on the ends of the opposing caliper pistons 9a, 9b via the backing plate 14a. The brake pads 12a, 12b each have an engagement surface 16 (FIG. 2B) which is adjacent to and engageable with one of the flat, opposing annular engagement surfaces 18a, 18b of the rotor 5 as is best shown in FIG. 1B. It should be noted that hydraulic pistons 9a, 9b and 9c, 9d are only one example of reacting members which may be used to extend and retract the brake pads 12a, 12b with respect to the rotor 5. Alternatively, the pads 12a, 12b may be extended and retracted by an air actuated piston, by a mechanical arrangement of cams and levers, or electrically via solenoids for example. The term "reacting member," as used herein, is intended to include all such mechanism and their equivalents and is not limited to the disclosed examples.

With reference now to FIGS. 1B and 2A, the housing 7 includes two pairs of opposing brake pad timing and retraction controllers 20a, 20b and 20c, 20d, respectively. Each pair of these brake pad timing and retraction controllers 20a, 20b and 20c, 20d is located to reduce any off center moment of force that may arise from the extension and retraction forces applied to the brake pads 12a, 12b by the pistons 9a, 9b and 9c, 9d and the resilient members in the controllers 20a, 20b and 20c, 20d. To this end, the controllers 20a, 20b and 20c, 20d may be aligned along a central vertical axis of the caliper housing 7 between the pairs of pistons 9a, 9b and 9c, 9d located on either side of the housing 7, as indicated in FIG. 1B. More generally, each pair of brake pad timing and retraction controllers 20a, 20b and 20c, 20d is disposed symmetrically with respect to a centroid of the resultant extension forces applied to the braking pads 12a, 12b by the hydraulic caliper pistons 9a, 9b and 9c, 9d. Such positioning of the brake pad timing and retraction controllers 20a, 20b and 20c, 20d reduces or eliminates undesirable off-center moments of force that can tilt the engagement surface 16 of the brake pads 12a, 12b out-of-plane during operation. It has been further observed that the aforementioned, out-of-plane forces may be eliminated by more than one such positioning or arrangement of the brake pad timing and retraction controllers 20a, 20b and 20c, 20d, and that at least one of these force-eliminating arrangements will also correspond to areas of maximum vibration displacement of the brake pads 12a, 12b. Hence it is possible to selectively position the brake pad timing and retraction controllers 20a, 20b and 20c, 20d in an arrangement that will simultaneously function to eliminate out-of-plane forces and unwanted, noise-generating vibration.

Each of the brake pad timing and retraction controller 20a, 20b and 20c, 20d includes a bolt 22, a caliper retraction collar 30, and a spring member 38 having limited compression travel. Each of these components will now be discussed in detail.

The bolt 22 (best seen in FIG. 5A) includes a cylindrical bolt shaft 24 as shown. Opposing ends of the shaft 24 include a threaded end 26 and a bolt head 28, respectively. The threaded end 26 of each bolt 22 is screwed into a threaded bore present in the backing plate 14a of its respective brake pad 12a, 12b. A caliper retraction collar 30 is frictionally mounted around the bolt shaft 22 by press-fitting. In this example of the invention, the collar 30 is not completely annular, but includes a slot 32 (shown in FIG. 5A) that facilitates the frictional mounting of the collar 30 to the bolt shaft 22. The inner diameter of the collar 30 is slightly smaller than the outer diameter of the bolt shaft 24 so that the collar 30 frictionally grasps the bolt shaft 24 when slidably forced over the threaded end 26. While the press-fitting of the collar 30 over the bolt shaft 24 may be implemented by heating the collar 30 in order to enlarge its inner diameter via thermal expansion prior to sliding the collar 30 over the end of the bolt shaft 24, such an assembly method is generally neither necessary nor preferred. In order for the brake pad timing and retraction controller 20a, 20b and 20c, 20d to operate properly, the frictional grip between the collar 30 and the bolt shaft 24 should always be greater than the amount of force necessary to maximally compress the spring member 38, but never greater than the extension force the pistons 9a, 9b and 9c, 9d apply to the brake pads 12a, 12b in order to implement the self-adjusting aspect of the controllers, which is described in greater detail hereinafter.

The housing 7 includes both a caliper retraction bore 34 which is slightly larger in diameter than the collar 30, and a bull clearance hole 36 which is slightly larger in diameter than the bolt shaft 24 such that the collar 30 and bolt shaft 24 are slidably accommodated within the bores 34 and 36, respectively. The spring member 38 is captured between the collar 30 and an annular ledge 39 that forms the interface between the bores 34 and 36. In the preferred embodiment, the spring member 38 is a dished washer commonly referred to as a Belleville spring having an inner diameter slightly larger than the outer diameter of the bolt shaft 24, and an outer diameter slightly less than the inner diameter of the caliper retraction bore 34. Although compression travel distances of between about 2.0 mm and 0.025 mm and even greater ranges are within the scope of the invention, the advantages of the invention are better realized with compression travel distances of between about 1.50 mm and 0.050, and are best realized with compression travel distances of between about 0.30 mm and 0.10 mm. While all of the aforementioned ranges of compression travel distances effectively delay the extension and accelerate the retraction of the pair of pistons 9a, 9b or 9c, 9d that the particular brake pad timing and retraction controller is associated with, the shorter travel distance ranges are more compatible with rapid brake responsiveness (i.e. a short brake pedal stroke to engage the brake pads 12a, 12b against the rotor 5).

In operation, the spring member 38 is normally in the uncompressed state illustrated in FIG. 2A. In such a state, the brake pads 12a, 12b are out of engagement with the rotor 5, leaving a small pullback distance "D" between these two components visible in FIG. 2B. When the vehicle operator depresses the brake pedal (not shown) of the vehicle, pressurized hydraulic fluid operates against the piston pairs 9a, 9b and 9c, 9d, extending the piston pairs against the spring force applied to them by the Belleville spring forming the spring member 38. As the pistons 9a, 9b and 9c, 9d extend, the bolt shaft 24 (which is connected to the backing plate 14a via threaded end 26) is pulled toward the right-hand side of FIG. 2A. The spring member 38 of each controller resists the extension of the pistons 9a, 9b and 9c, 9d as it is compressed the distance "D" between the collar 30 and the annular ledge 39 from the dished shape illustrated in FIG. 2A into the more flattened shape illustrated in FIG. 3A.

If the brake pad timing and retraction controllers 20a, 20b and 20c, 20d are provided on the rear wheels of a vehicle but not the front wheels, a vehicle that would otherwise have a back wheel braking engagement bias can be advantageously transformed into a vehicle having a front wheel engagement braking bias wherein the front wheels brake slightly sooner than the rear wheels. Such a front wheel braking engagement bias enhances vehicle control during a braking operation. Alternatively, such a front wheel braking engagement bias can be achieved by providing brake pad timing and retraction controller 20a, 20b and 20c, 20d on all four wheels, the difference being that the spring elements 38 used in the rear wheel calipers would be weaker than the spring elements used in the front wheel calipers. Finally, left-right braking wheel biases can be achieved by providing brake pad timing and retraction controller 20a, 20b and 20c, 20d exclusively on either the right or left wheels, or by providing brake pad timing and retraction controller 20a, 20b and 20c, 20d on all four wheels, the difference being that the strength of the spring elements 38 used in the right wheel calipers would be different than the strength of the spring elements 38 used in the left wheel calipers.

In addition to momentarily delaying the extension of the piston pairs 9a, 9b and 9c, 9d, the brake pad timing and retraction controller 20a, 20b and 20c, 20d also advantageously reduce brake pad vibration which can result in reduced braking efficiency as well as undesirable noises. Such vibration is caused by a resonant oscillation of the surface of the brake pads 12a, 12b against the opposing flat, annular surfaces 18a, 18b, of the rotor 5. The spring element 38 in each of the brake pad timing and retraction controller 20a, 20b and 20c, 20d effectively dampens such undesirable vibration by absorbing the energy associated with the resonant oscillations of the brake pads 12a, 12b. In an embodiment, the location of the maximum amplitudes of such undesirable vibration may be located via modal analysis. Because the maximum amplitude of such vibration is likely to be centrally located in the brake pads 12a, 12b concentric along the section line 1B-1B illustrated in FIG. 1A, locating each pair of brake pad timing and retraction controller 20a, 20b and 20c, 20d on opposing sides of the section line 1B-1B illustrated in FIG. 1A is likely to enhance the effectiveness of the spring elements 38 in the brake pad timing and retraction controller 20a, 20b and 20c, 20d in damping the unwanted vibrations.

Finally, it is observed that the restorative force applied by the spring members 38 in the brake pad timing and retraction controller 20a, 20b and 20c, 20d are surprisingly effective in reducing parasitic brake losses by more rapidly, positively and uniformly disengaging the brake pads 12a, 12b from the rotor 5 when the brake pedal is released, thereby saving energy and increasing the effective miles obtained per gallon of fuel. Parasitic brake losses in a diesel-powered vehicle can result in a loss of 215.24 gallons of diesel fuel per year. Assuming a fuel cost of $3.00 per gallon, this translates into a loss of $645 per year which can be substantially if not completely obviated by the incorporation of the previously described brake pad timing and retraction controller 20a, 20b and 20c, 20d into the brake calipers of the vehicle. The avoidance of parasitic brake losses also enhances vehicle acceleration and other measures of performance.

Figure 4:
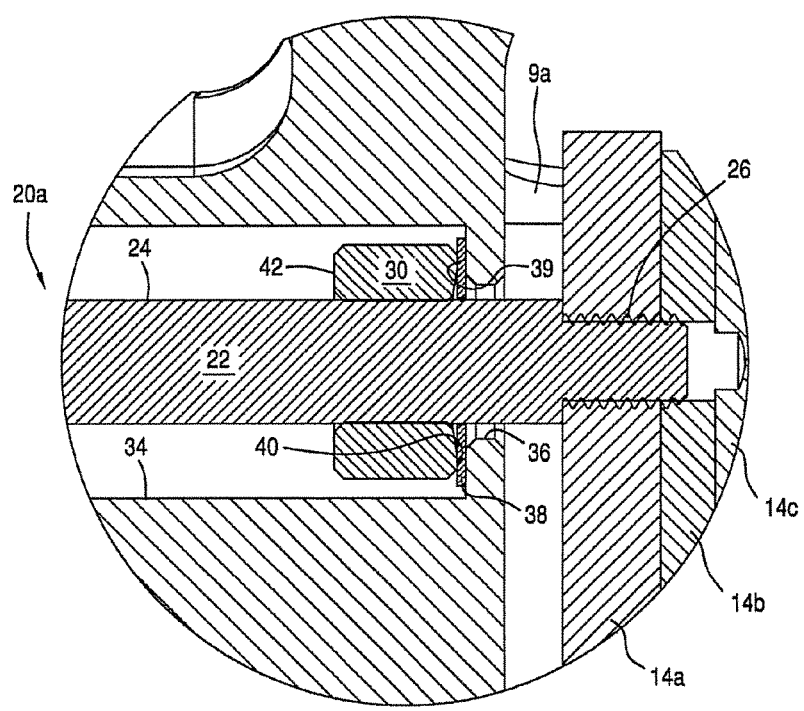
FIG. 4 is an enlargement of the of the circled area in FIG. 1B labeled "2A", illustrating the principal components of the brake pad timing and retraction controller of the invention in an actuated state with a worn brake pad, and how the split collar of the controller slidably adjusts its position on a bolt shaft to accommodate brake pad wear.

FIG. 4 illustrates the self-adjusting feature of the brake pad timing and retraction controller 20a, 20b and 20c, 20d. As previously mentioned, the frictional engagement between the collar 30 and the bolt shaft 24 is selected such that the collar 30 can completely compress the spring member 38 without sliding along the bolt shaft 24. However, when the brake pads 12a, 12b wear down to an extent that requires a greater piston stroke for the pad engagement surface 16 to frictionally engage the annular surfaces 18a, 18b of the rotor 5, the frictional engagement between the collar 30 and the bolt shaft 24 is insufficient to prevent the collar 30 from sliding on the shaft 24 in response to the extension force applied to the bolt shaft by its respective piston pair 9a, 9b or 9c, 9d. Consequently, the collar 30 will slide to the position necessary to flatten the spring member 38 into the position shown in FIG. 4 in order to engage the pad surface 16 against the rotor 5 as shown in the position illustrated in FIG. 3B.

Figure 5A:
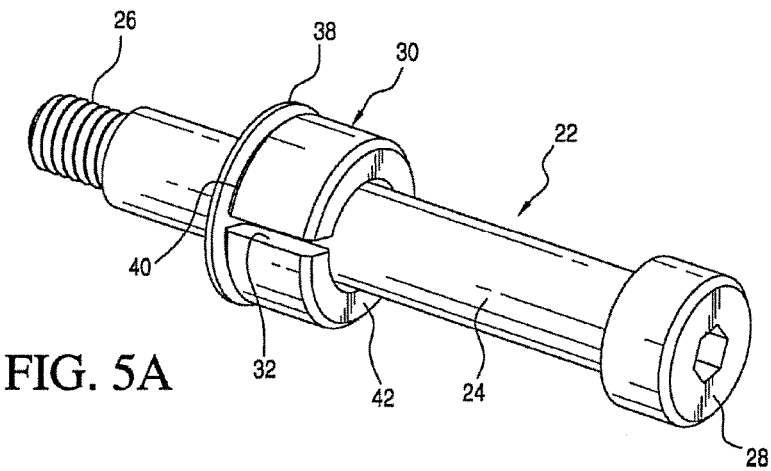
FIG. 5A is a perspective drawing of the bolt, split collar and Belleville spring of the brake pad timing and retraction controller of the invention.
Figure 5B:
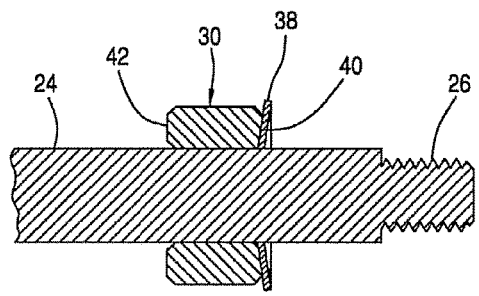
FIG. 5B is a partial cross sectional view of the bolt, split collar and Belleville spring illustrated in FIG. 5A, with the chamfered side of the split collar in engagement with the convex surface of the Belleville spring.
Figure 5C:
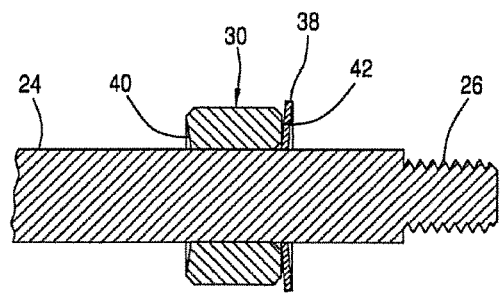
FIG. 5C is a partial cross sectional view of the bolt, split collar and Belleville spring illustrated in FIG. 5A, with the flat side of the split collar in engagement with the convex surface of the Belleville spring.

FIGS. 5A-5C illustrate how the collar 30 of the brake pad timing and retraction controller 20a, 20b and 20c, 20d may advantageously be used to adjust the stroke length of the Belleville spring 38. The generally cylindrical shape of the collar 30 allows this component to be reversible when assembled over the shaft 24 of the bolt 22. Accordingly, either of the two opposing sides 40 or 42 may be used to engage the Belleville spring 38 when the collar 30 is press-fitted over the shaft 24 of the bolt 22. In this example of the invention, one of these surfaces 40 is provided with a chamfered, dish-shaped profile that is partially complementary in shape to the Belleville spring 38 in order to shorten the stroke length of the spring 38, while the other of these surfaces 42 has a flat profile to maximize the stroke length of the Belleville spring 38.

Such a structure advantageously allows the stroke length of the Belleville springs 38 used in the brake pad timing and retraction controller 20a, 20b and 20c, 20d to be easily shortened or lengthened to accommodate the specific type of brake caliper that the invention is incorporated in. Of course, it would be possible to adjust the stroke length by using a stack of Belleville springs as the resilient member, and by adding or subtracting the number of springs in the stack. However, such a technique for adjusting stroke length does not allow relatively small adjustments to be made in the short preferred stroke lengths (i.e. between about 1.50 mm and 0.025 mm) of the embodiments. By contrast, the selective profiling of the spring-engaging surface of the collar 30 allows extremely small and precise adjustments to be made in embodiments of the brake pad timing and retraction controller where only a single Belleville spring is used.

Figure 6:
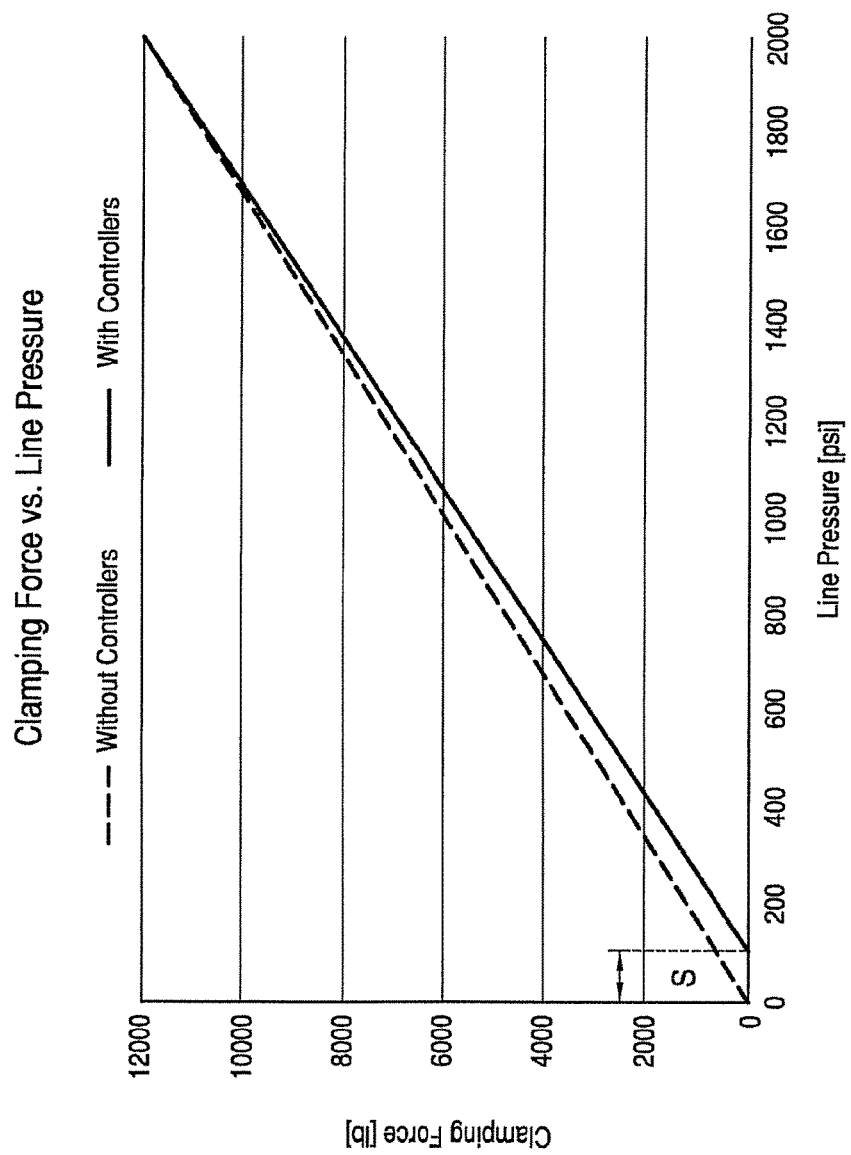
FIG. 6 is a graph illustrating how the clamping force of a brake caliper with the controller (solid line) is slightly delayed and reduced relative to the clamping force of a brake caliper without the controller (dashed line) as a function of hydraulic line pressure of the brake pad pistons.

The compression stroke of the spring 38 momentarily delays extension of the brake pads. This is indicated in the graph of FIG. 6, which illustrates how the clamping force of a brake caliper with controllers 20a, 20b and 20c, 20d (solid line) is slightly delayed and reduced relative to the clamping force of a brake caliper without the controllers of the invention (dashed line). Note how zero clamping force is initially generated between the brake pads 12a, 12b and the rotor 5 for the first 100 psi of hydraulic line pressure (indicated by the distance "S"), as the first 100 psi is used to overcome the stroke of the spring 38. It is to be understood that a spring 38 may be selected such that it is overcome at a lesser pressure than 100 psi or a greater pressure. Note further how the resulting clamping force indicated by the solid line lags slightly behind the clamping force generated by a caliper without controllers 20a, 20b and 20c, 20d as a result of the hold-off biasing force that the spring 38 applies against the extension force of the piston pairs 9a, 9b and 9c, 9d. As indicated previously, this slight reduction in clamping force in brake calipers incorporating the controllers of the invention is what advantageously allows the relative timing of different brakes of a vehicle to be adjusted to produce a desired timing bias between the brakes on different pairs of tires (i.e. rear vs. front, right vs. left). The exact and relative amounts of momentary delay and reduction in clamping force is of course dependent upon the relative stroke and spring force properties of the spring members 38 used in the controllers 20a, 20b and 20c, 20d as well as the exact and relative amounts of the piston extension forces.

Figure 7:
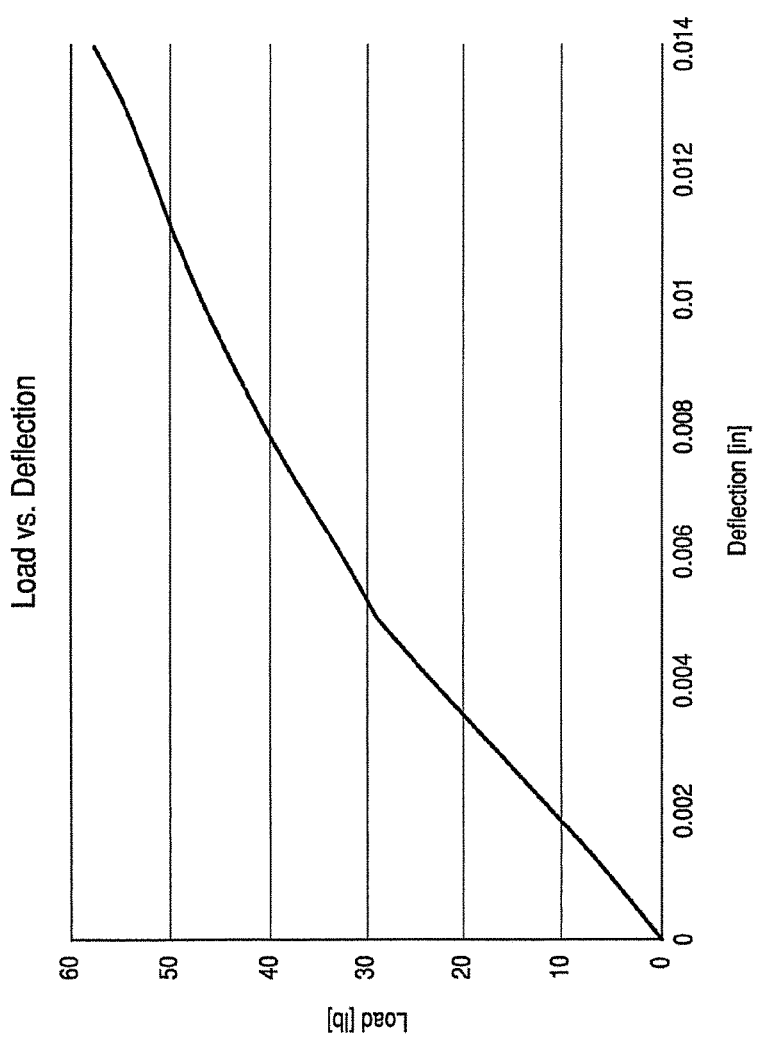
FIG. 7 is a graph illustrating the force/distance characteristics of the Belleville spring used in the exemplary embodiment of the invention.

The precise amounts of both the momentary delay and force reduction imposed on the piston stroke and forced "snap-back" of the brake pads 12a, 12b from the rotor 5 are dependent upon, and may be adjusted by, the specific stroke length and spring force properties of the spring member 38. FIG. 7 is a graph illustrating how the force of the Belleville spring 38 used in the example of the invention varies over its compression travel. FIG. 7 illustrates two important characteristics of the spring 38. First, the spring 38 is a relatively "stiff" spring, requiring approximately 4.7 lbs. of force for every 0.001 inches of compression. Such a high-force, short compression travel advantageously allows the controllers 20a, 20b and 20c, 20d to be used in combination with high performance brake systems without compromising the short brake pedal stroke desired in such systems. This same characteristic also allows the controllers 20a, 20b and 20c, 20d to be made compactly with a single Belleville spring 38, which is important in view of the limited space available in the brake caliper 3. Secondly, the substantial linearity of the force/distance property of the spring 38 results in a modified clamping force curve (see FIG. 6) that substantially tracks the unmodified clamping force curve with respect to the line pressure generated by the master cylinder of the brake system. Thus there is little or no perceptible difference in the "feel" of the brake pedal experienced by the vehicle operator between brakes modified by the controllers 20a, 20b and 20c, 20d and unmodified brakes.

Figure 16:
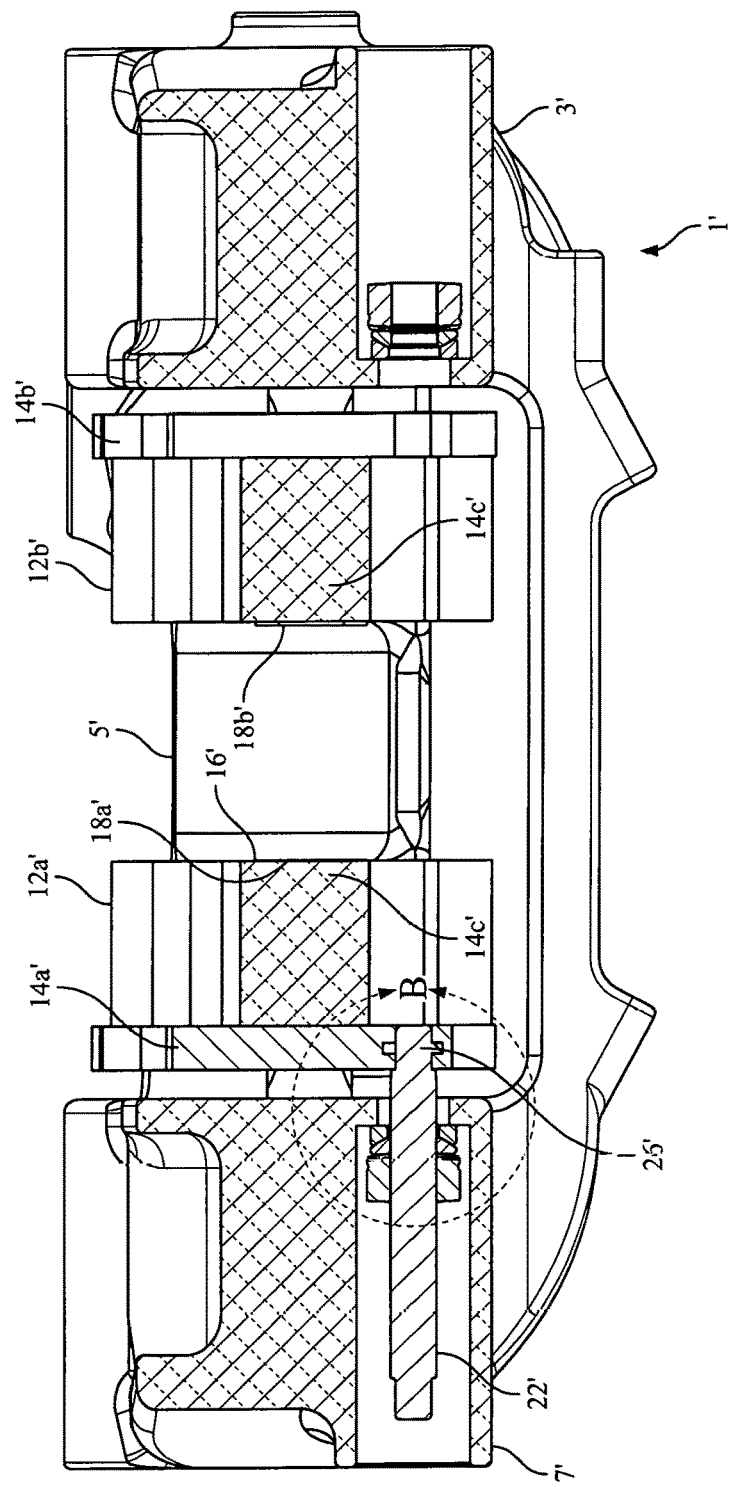
FIG. 16 is a cross-sectional top view of a second brake caliper assembly constructed in accordance with the teachings herein.

The brake assembly shown in FIG. 16 includes features of those described previously with reference to the embodiment shown in FIG. 1. Referring now to FIGS. 8 and 16, there is provided a brake assembly 1' including the brake caliper 3' constructed in accordance with embodiments disclosed herein below. The caliper 3' together with a rotor 5' are attached to a wheel hub (not shown) which may be the wheel hub of an automotive vehicle. In this example, the brake caliper 3' includes a housing 7' in which two pairs of opposing hydraulic caliper pistons are slidably mounted within cylinders (not shown). Opposing brake pads 12a', 12b' may each include a backing plate 14a', 14b' and an underlayer that secures a layer of pad material 14c' to the backing plate 14a'. The opposing brake pads 12a', 12b' are mounted on the ends of the opposing caliper pistons via the backing plate 14a'. The brake pads 12a', 12b' each have an engagement surface 16' which is adjacent to and engageable with one of the flat, opposing annular engagement surfaces 18a', 18b' of the rotor 5' as is best shown in FIG. 16. It should be noted that hydraulic pistons 9a, 9b and 9c, 9d are only one example of reacting members which may be used to extend and retract the brake pads 12a', 12b' with respect to the rotor 5'. Alternatively, the pads 12a', 12b' may be extended and retracted by an air actuated piston, by a mechanical arrangement of cams and levers, or electrically via solenoids for example. The term "reacting member," as used herein, is intended to include all such mechanism and their equivalents and is not limited to the disclosed examples.

Figure 8A:
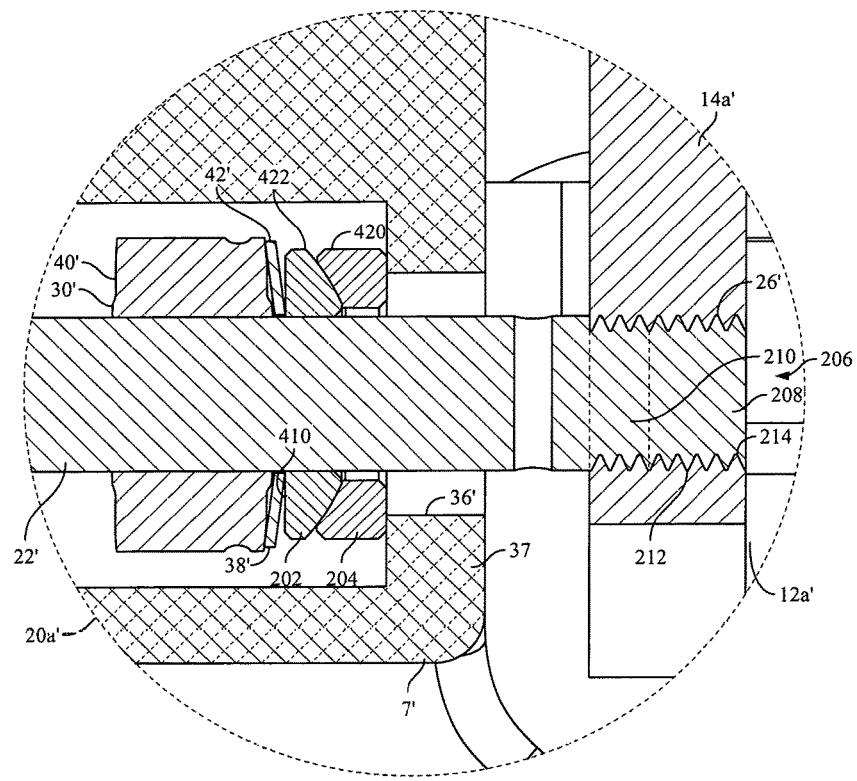
FIG. 8A is a side, cross-sectional view of the caliper housing and backing plate illustrated within the inset B in FIG. 16 and having a lock-connection in accordance with a first embodiment including lock threading.

Referring now to FIG. 8A, in an embodiment, a brake pad timing and retraction controller 20a' comprises a bolt shaft 22' having a threaded end portion 26' for connection with the backing plate 14a' of the brake pad 12a'. As in the previous embodiments, the caliper retraction collar 30' is preferably press fitted upon the shaft 22'. The caliper retraction collar 30' preferably includes first and second surfaces 40' and 42' as previously described. A spring 38', preferably in the form of a Belleville spring, is situated on the bolt shaft 22' adjacent the caliper retraction collar 30'.

The bolt shaft 22' extends through a bore 36' in the housing 7'. The bore 36' defines in part a rim portion 37 of the housing 7' adjacent the shaft 22'.

In this embodiment and those which follow, preferably a first ring 202 and a second ring 204 are interposed between the spring 38' and the rim portion 37 of the housing 7'. The housing rim portion 37 the first and second rings 202, 204 establish a stop with respect to displacement (compression) of the Belleville spring 38'. The first and second rings 202, 204 also allow for a misalignment of the brake pad to the caliper without damaging the bolt 22'.

Figure 8B:
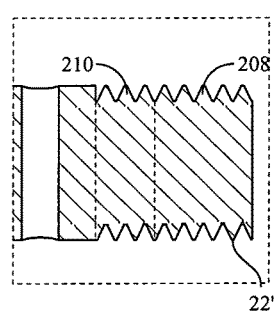
FIG. 8B is a detail side view of the shaft end portion shown in FIG. 8A.

Referring to the FIGS. 8A and 8B, the embodiment shown therein further includes a lock-connection 206 between the threaded end portion 26' of the bolt 22' and the backing plate 14a'. The lock-connection 206 comprises a first engaging component 208 in the form of a leading zone of standard threading on the end portion 26' of the bolt 22', and a locking component 210 comprises a trailing zone of lock threading along the end portion 26' of the bolt shaft 22'. In this embodiment, the lock-connection further comprises a receiver component 212 preferably in the form of a threaded bore in the backing plate 14a' of a brake pad 12a'. In this embodiment, a standard threading extends throughout the extent of the threaded bore 212. The engaging component 208 comprises a leading zone of matching standard threading, which is "leading" in the sense that it is the first in time to engage the standard threading of the threaded bore receiver 212, which arrangement assures proper alignment of the shaft 22' with backing plate 14a' (and the brake pad 12a) before the locking component 210 is engaged. Upon full engagement of the first and second zones of threading 208 and 210 on the shaft end portion 26' with the threaded bore 212 of the backing plate 14a', a lock-connection 206 is established, wherein the shaft 22' with backing plate 14a' are properly aligned and locked together. In addition, the locking component 210 of the lock-connection 206 is counter-active against the effects of vibration, heat and torques typically imposed upon the connection 206 during a braking action, especially those effects tending to rotate the engaging component 208 out of a full and secure engagement.

Figure 8C:
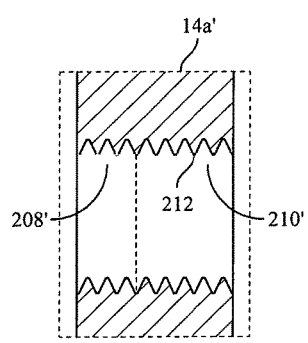
FIG. 8C is a detail cross-sectional side view of the threaded bore in the back plate shown in FIG. 8A.

Referring now to FIG. 8C, it is contemplated that the locking component 210 of the lock-connection 206 may comprise not only a trailing zone of lock threading 210 on the end portion 26' of the shaft 22' but also a trailing zone of lock threading 210' within the threaded bore 212 of the backing plate 14a. Alternatively, the locking component 210 may be disposed only along the threaded bore portion 210' of the backing plate 14a'.

Preferably, in all instances, the leading threading zone 208 on the shaft 22' and/or a leading threading zone 208' along the threaded bore 212 engages first so as to align the shaft 22' and the backing plate 14a', whereupon the locking component 210 then engages to complete and secure the luck-connection 206.

In another form of this embodiment, a locking threading extends throughout the extent of the threaded bore 212 and a standard threading extends throughout the extent of the threaded, shaft end portion 26'.

A suitable locking thread for application in this embodiments include a lock threading from the Spiralock Corporation that transforms a standard internal thread profile into a self-locking female thread form with the addition of a 30° wedge ramp at the root of the female thread. This unidirectional locking feature, called Spiralock® is compatible with standard 60° male thread fasteners.

Preferably, the end portion of the shaft 22' is constructed of an alloy, hardened or otherwise treated to be more resistant to thread stripping than the material (or treatment) selected for the receiver portion 212 of the backing plate 14a'. Accordingly, in a change of of brake pads, any occurrence of unintended stripping to overcome the lock-connection 206 will be incurred along threads 212 of the backing plate 14a, which is being replaced.

Figure 10:
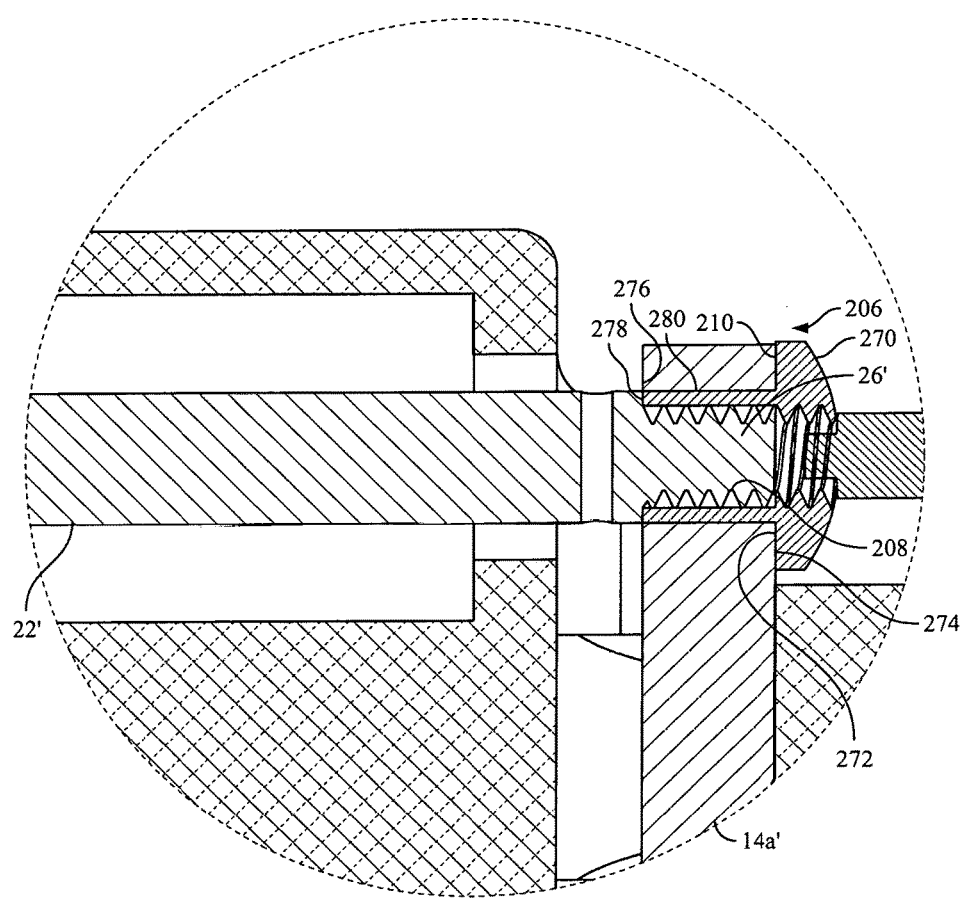
FIG. 10 is a side cross-sectional view of the caliper housing and backing plate illustrated within the inset B in FIG. 16 and having a lock-connection in accordance with a second embodiment including a binding post.

Referring now to FIG. 10, in a second embodiment, a flanged binding post (threaded insert) 270 is fitted into a bore 280 in the backing plate 14a' from a backside 274 of the backing plate 14a'. The flanged binding post 270 includes an axially directed, threaded bore 208 and a flange 272 adapted to be brought into a surface to surface contact with the backside 274 of the backing plate 14a'. In this embodiment, the engaging component of the lock-connection 206 is in the form of the internal threading along the bore 208 of the flanged binding post 270 and the locking component 210 comprises a tightening of the flange 272 of the flanged binding post 270 against the backside surface 274 of the backing plate 14a' upon threading of the end portion 26' of the bolt shaft 22' into the flanged binding post 270.

In the embodiment shown in FIG. 10, preferably the internal threading 208 of the flanged binding post 270 extends through the entire length of the flanged binding post 270. Preferably, the threaded end portion 26' of the shaft 22' will continue to thread into the threaded insert 270 until threaded insert 270 urges its flange 272 against the backside surface 274 of the backing plate 14a' with sufficient force to be counteractive against the effects of vibration, heat and torques typically imposed upon the connection 206 during a braking action, especially those effects tending to rotate the components 208 out of a full and secure engagement.

In an embodiment, the threading of the threaded end portion 26' of the shaft 22' is allowed to continue to until a shoulder 276 of the shaft 22' contacts an opposing rim 278 of the threaded insert 270, whereupon further threading of the shaft 22' into the threaded insert 270 is limited so that a sufficient lock-connection 206 is consistently achieved.

Optionally, the threaded insert 270 may be press fitted into a bore 280 provided in the backing plate 14a'. A threaded connection may be used along the bore 280 in lieu of a press-fitted connection.

In a further embodiment, a zone of trailing lock threading as taught in reference to FIGS. 8A, 8B and 8C may be employed along any of the threaded connections of the immediate embodiment to further secure the lock-connection 206.

Figure 11A:
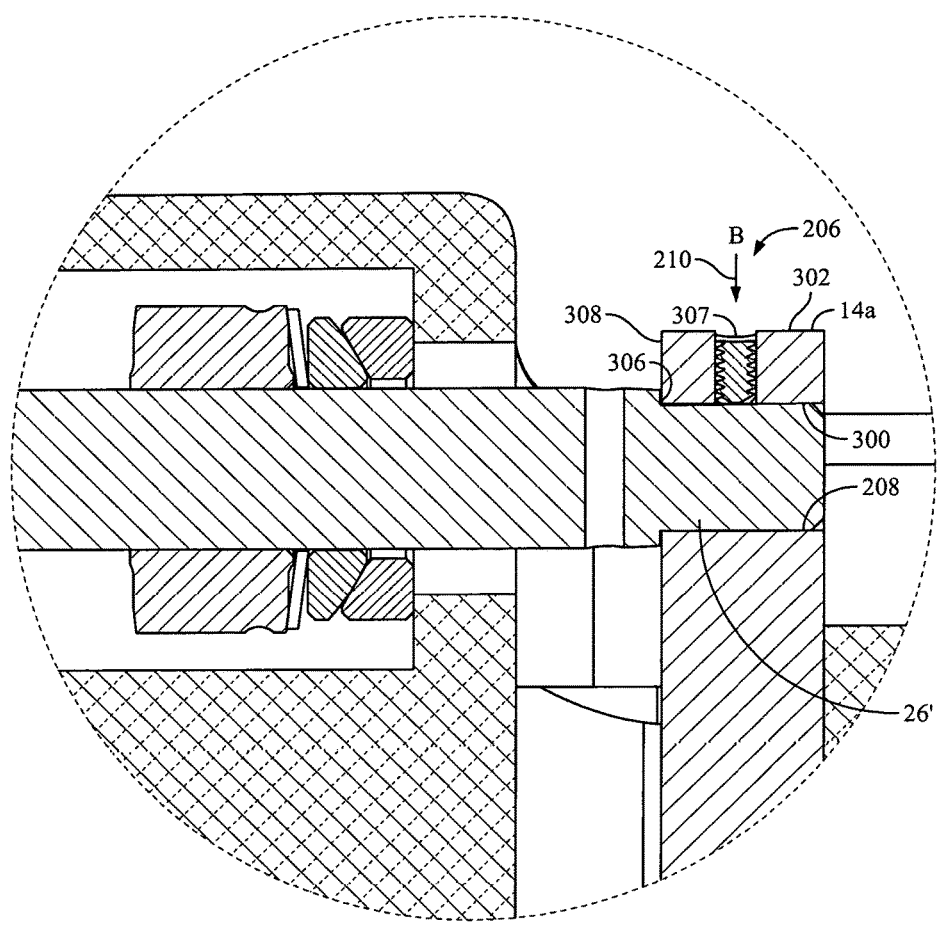
FIG. 11A is a side cross-sectional view of the caliper housing and backing plate illustrated within the inset B in FIG. 16 and having a lock-connection in accordance with a third embodiment including a screw thread lock.
Figure 11B:
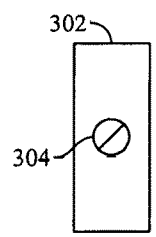
FIG. 11B is a view of the screw thread lock of FIG. 11A as viewed in the direction of arrow B.

Referring now to FIGS. 11A and 11B, in another embodiment, a lock-connection 206 between the backing plate 14a' and the shaft 22' comprises an engaging component 208 in the form of a fit between a bore 300 provided in the backing plate 14a' and the end portion 26' of shaft 22' and a locking component 210 comprising a screw-thread lock operative from an outer rim portion 302 of the backing plate 14a'. In an embodiment, the locking component 210 comprises a threaded screw body 304 in a threaded bore 307, wherein the threaded bore 307 is open to the outer rim 302 and is oriented orthogonally with respect to the longitudinal axis of the bore 300.

Preferably, in this embodiment a shoulder 306 is provided at the base of the end portion 26' of the shaft 22' which is brought in to contact with a rim 308 of the backing plate 14a' so as to register proper placement of the shaft 22' before tightening of the threaded body 304. Upon tightening of the threaded body 304 against an adjacent portion of the end portion 26' of the shaft 22, a lock-connection 206 is achieved having sufficient locking force to be counteractive against the effects of vibration, heat and torques typically imposed upon the connection 206 during a braking action, especially those effects tending to rotate the engaging component 208 out of a full and secure engagement.

In this embodiment, the engaging portion 208 assures a desired alignment of the shaft 22' before locking of the locking component 210 and may comprise a close friction fit between the bore 300 in the backing plate 14a' and the end portion 26' of the shaft 22', or a press fit or a threaded fit and/or a threaded fit including a zone of lock threading as taught in reference to FIGS. 8A, 8B and 8C to further secure the lock-connection 206.

Figure 12A:
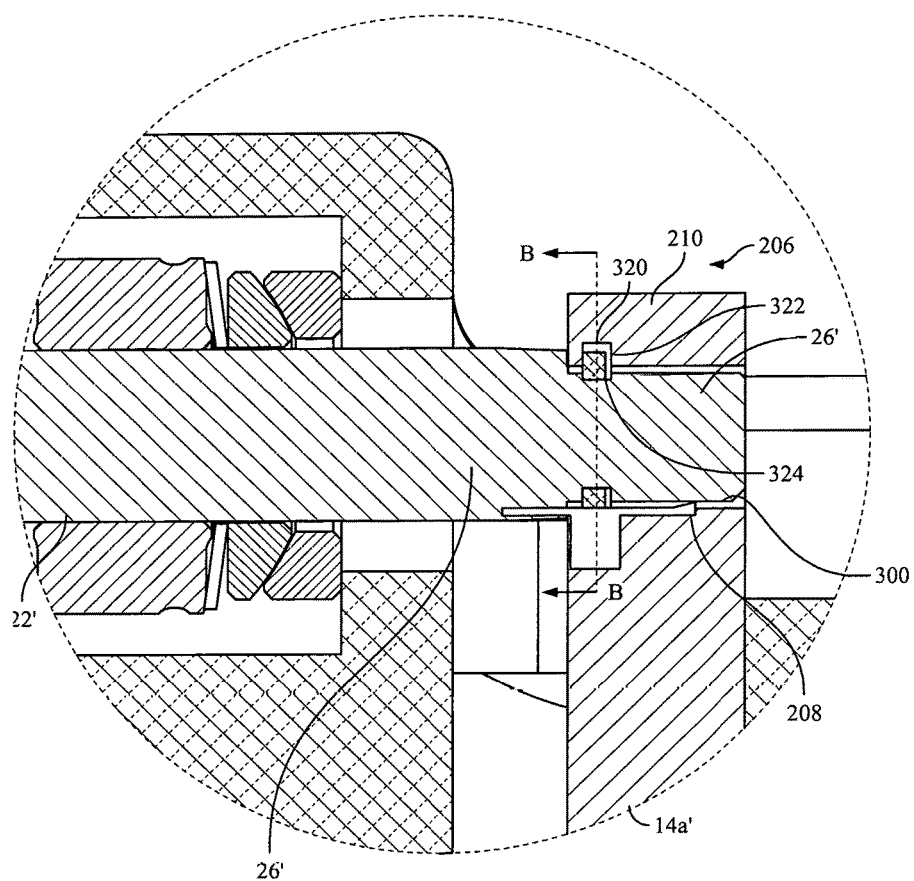
FIG. 12A is a side cross-sectional view of the caliper housing and backing plate illustrated within the inset B in FIG. 16 and having a lock-connection in accordance with a fourth embodiment including a retaining clip.
Figure 12B:
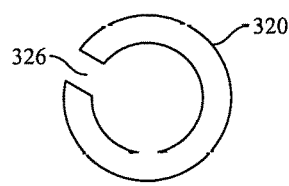
FIG. 12B is a detail planar view of the retaining clip as viewed from the double arrow B-B in FIG. 12A.

Referring now to FIGS. 12A and 12B, in another embodiment, a lock-connection 206 between the backing plate 14a' and the shaft 22' comprises an engaging component 208 in the form of a fit between a bore 300 provided in the backing plate 14a' and conforming (mating) end portion 26' of shaft 22' and a locking component 210 in the form of a retaining clip 320 disposed within opposing annular recesses 322, 324 provided in the bore 300 in the backing plate 14a' and in the end portion 26' of the shaft 22', respectively.

Referring also to FIG. 12B, preferably, the retaining clip (split-ring) 320 has a rectangular cross section and is ring-like, but for an annular break 326, which allows the retaining clip 320 to be circumferentially compressed. Preferably, the retaining clip 320 is resilient and metallic. In an embodiment, the retaining clip 320 is carried upon a trailing portion of the end portion 26' of the shaft 22' such that upon entry of the shaft end portion 26' into the bore 300 in the backing plate 14a', the walls of the bore 300 compresses the retaining clip 320 fully into the recess 324 provided in the end portion 26' until the shaft 22' is moved into a position where the annular recesses 322 and 324 are mutually opposed, whereupon the retaining clip 320 expands into the space defined between the opposing annular recesses 322, 324 to complete the lock-connection 206.

In the alternative, the retaining clip 320 may be carried within the recess 322 provided in the bore 300 of the backing plate 14a', in which case, upon insertion of the end portion 26' of the shaft into the bore 300 of the backing plate 14a', the end portion 26' urges the resilient ring 320 radially outwardly into space provided by the annular recess 322 in the backing plate 14a' until the recesses 322, 324 come into an opposing relation whereupon the retaining clip 320 is released and completes the lock-connection 206.

Upon completion of the lock-connection 206, the retaining ring 320 provides sufficient locking force to be counteractive against the effects of vibration, heat and torques typically imposed upon the connection 206 during a braking action, especially those effects tending to rotate the engaging component 208 out of a full and secure engagement.

In this embodiment, the engaging portion 208 assures a desired alignment of the shaft 22' before locking of the locking component 210. The engaging portion 208 may comprise a close friction fit between the bore 300 in the backing plate 14a' and the end portion 26' of the shaft 22', or a press fit therebetween or a threaded fit therebetween. It is contemplated that if the engaging component 208 comprises a threaded fit, it may also include a zone of lock threading as taught in reference to FIGS. 8A, 8B and 8C to further secure the lock-connection 206.

Figure 13A:
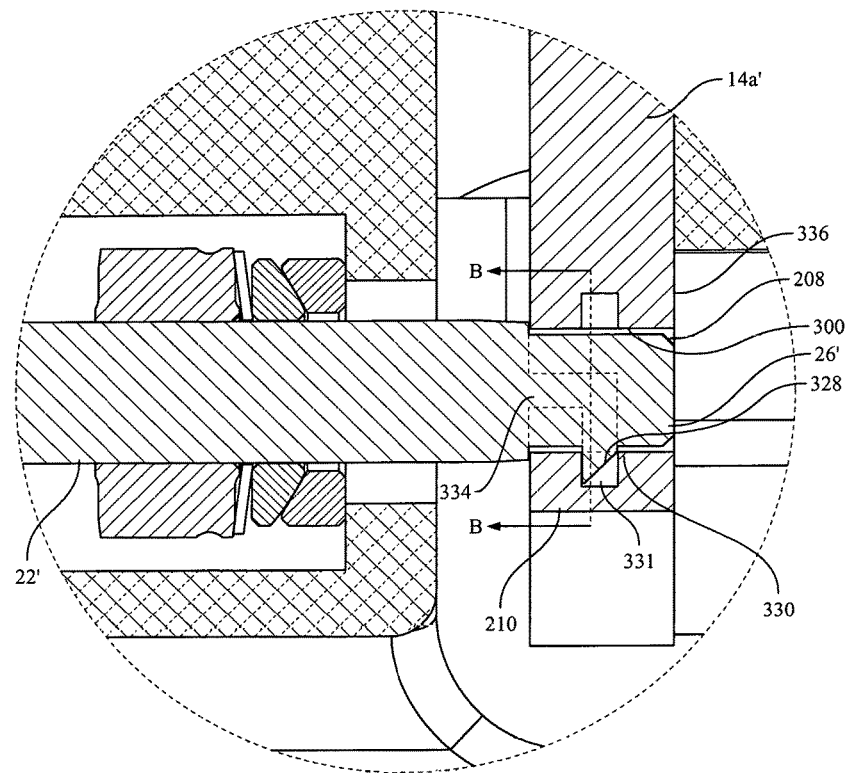
FIG. 13A is a side cross-sectional view of the caliper housing and backing plate illustrated within the inset B in FIG. 16 and having a lock-connection in accordance with a fifth embodiment including a self-lock key.
Figure 13B:
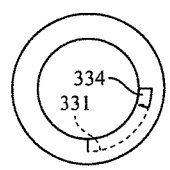
FIG. 13B is a detail cross-sectional view of the self-lock key as viewed from the double arrow B-B in FIG. 13A.
Figure 13C:
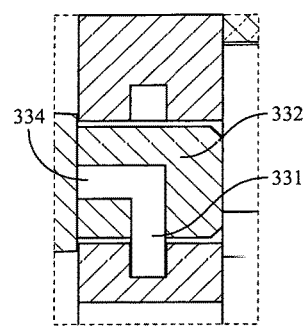
FIG. 13C is a detail cross-sectional view of the bore in the backing plate of the embodiment shown in FIG. 13A.

Referring now to FIGS. 13A, 13B and 13C, in another embodiment, a lock-connection 206 between the backing plate 14a' and the shaft 22' comprises an engaging component 208 in the form of a fit between a bore 300 provided in the backing plate 14a' and a conforming (mating) end portion 26' of shaft 22' and a locking component 210 in the form of a self-locking key arrangement 330 provided between the bore 300 in the backing plate 14a' and in the end portion 26' of the shaft 22'.

In an embodiment, the bore 300 and the backing plate 14a' is provided with a slot 332 having a transverse slot portion 331 and a longitudinal slot portion 334 extending from the transverse slot portion 331 to a leading (front) side of the backing plate 14a'. A radially extending key 328 is provided on the end portion 26', which is sized to slidingly travel along the longitudinally extending slot portion 334 as the shaft 22 is inserted into the slotted bore 300, until the key 328 arrives at the transverse slot portion 331, whereupon the shaft 22' is rotated and the key 328 enters and establishes a close locking fit with the transverse slot portion 331. In an embodiment, the transverse slot portion 331 accommodates a quarter turn of the shaft 22', although it is contemplated that the transverse slot may be longer or shorter to establish a different length of locking turn such as a half locking turn or a three-quarter locking turn or the like. Upon completion of the locking turn, a lock-connection 206 is established with sufficient locking effect to be counteractive against the effects of vibration, heat and torques typically imposed upon the connection 206 during a braking action, especially those effects tending to rotate the component 208 out of a full and secure engagement.

In another embodiment, the slot 332 may be provided on the end portion 26' of the shaft 22' and the key 328 is provided at a location along the bore 300 of the backing plate 14*a*.

In yet another embodiment, the key 328 may be spring loaded and present an inclined, leading face such that upon insertion or threading of the shaft end portion 26' into the bore 300, the key 328 is retracted to allow further insertion and/or threading until such time that the key 328 enters a transversely directed slot 331. In this embodiment, the slot 332 is without a longitudinal component.

In these embodiments, the engaging portion 208 assures a desired alignment of the shaft 22' before locking of the locking component 210, and may comprise a close sliding fit between the bore 300 in the backing plate 14*a*' and the end portion 26' of the shaft 22'.

Preferably, the transverse slot 331 is located at a midpoint along the bore 300 in the backing plate 14*a*', but other locations along the bore 300 are contemplated.

Figure 14A:
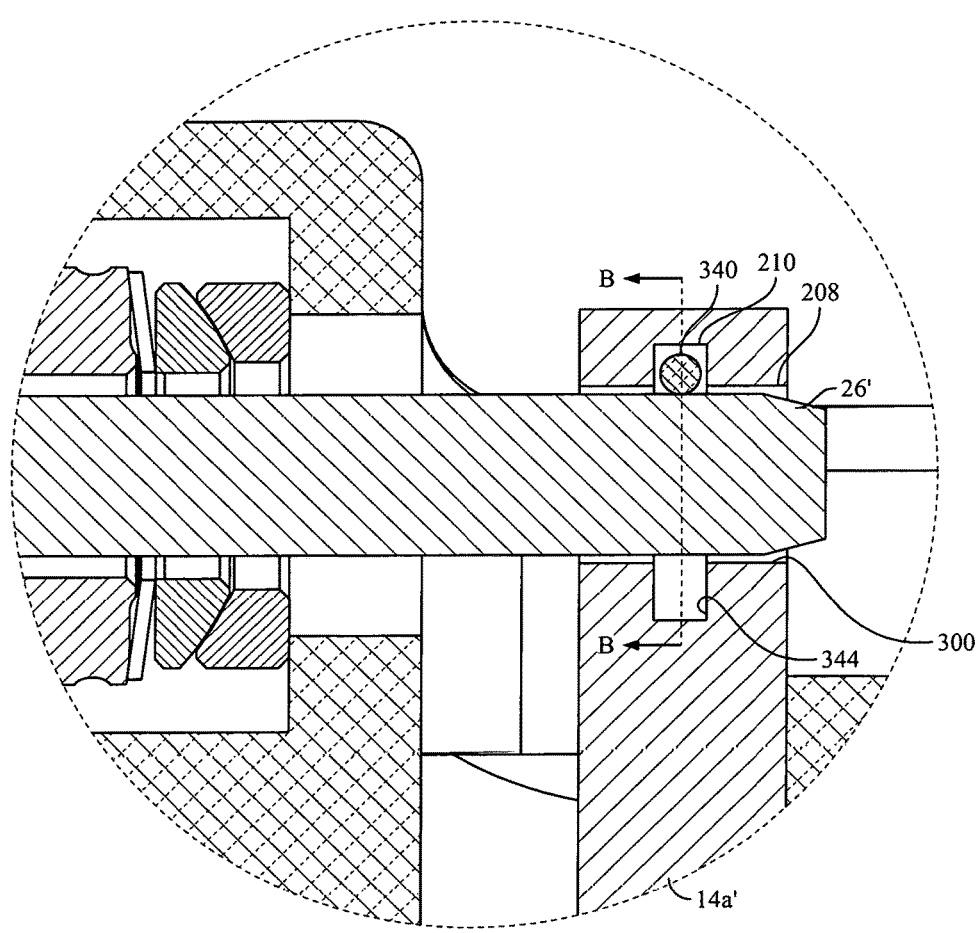
FIG. 14A is a side cross-sectional view of the caliper housing and backing plate illustrated within the inset B in FIG. 16 and having a lock-connection in accordance with a sixth embodiment including a quick release pin.
Figure 14B:
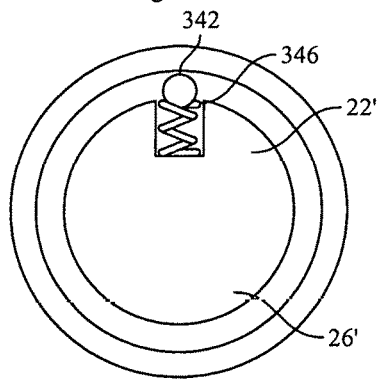
FIG. 14B is a detail view of the quick release pin as viewed from the double arrow B-B in FIG. 14A.

Referring now to FIGS. 14A and 14B, in another embodiment, a lock-connection 206 between the backing plate 14*a*' and the shaft 22' comprises an engaging component 208 in the form of a fit between a bore 300 provided in the backing plate 14*a*' and a conforming (mating) end portion 26' of shaft 22' and a locking component 210 in the form of a quick release pin 340 operative between the bore 300 in the backing plate 14*a*' and the end portion 26' of the shaft 22'.

In an embodiment, a spring loaded ball 346 is provided at a location along the end portion 26' of the shaft 22', and the bore 300 in the backing plate 14*a*' is provided with an annular recess 344, the latter being sized to at least partially receive the body of the spring loaded ball 346 whereby the engagement between end portion 26' of the shaft 22' becomes locked against the effects of vibration, heat and torques typically imposed upon the connection 206 during a braking action, especially those effects tending to rotate the component 208 out of a full and secure engagement.

Upon an initial insertion or threading of the end portion 26' into the bore 300, the spring loaded ball 346 is pushed into the recess 342 so that the insertion and/or threading can continue until the spring loaded ball 346 arrives at the location of the recess 344 in the bore 300.

In an embodiment, the ball element of the spring loaded ball 346 may have a rectangular shape instead of the spherical shape of the embodiment shown in the FIGS. 14A and 14B.

In another embodiment, the spring loaded ball 346 may be established at a location along the bore 300 of the backing plate 14*a*' and the recess 344 may be located along the end portion 26' of the shaft 22'.

In these embodiments, the engaging portion 208 assures a desired alignment of the shaft 22' before locking of the locking component 210, and may comprise a close sliding fit between the bore 300 in the backing plate 14*a*' and the end portion 26' of the shaft 22', or a press fit therebetween or a threaded fit therebetween. It is also contemplated that the threading may also include a zone of lock threading as taught in reference to FIGS. 8A, 8B and 8C to further secure the lock-connection 206.

Figure 15:
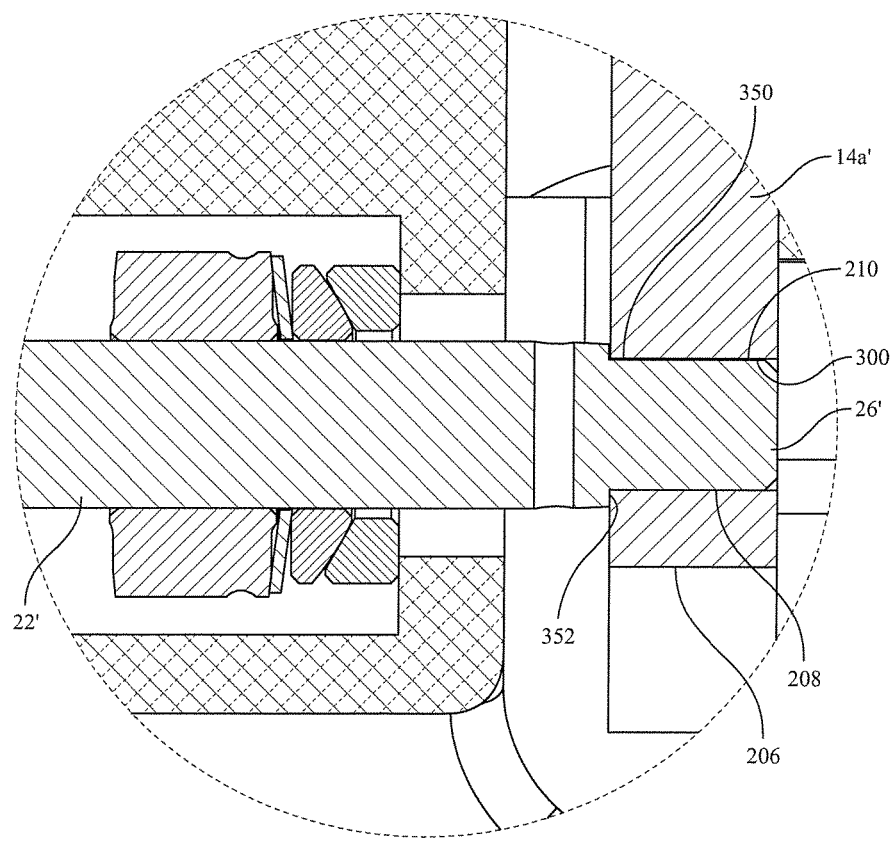
FIG. 15 is a side cross-sectional view of the caliper housing and backing plate illustrated within the inset B in FIG. 16 and having a lock-connection in accordance with a seventh embodiment including a press fit.

Referring now to FIG. 15, in another embodiment, a lock-connection 206 between the backing plate 14*a*' and the shaft 22' comprises an engaging component 208 in the form of an initial friction fit between the bore 300 provided in the backing plate 14*a*' and a conforming (mating) end portion 26' of shaft 22' and a locking component 210 in the form of a press fit 350 being established between the bore 300 and the trailing portion 26' of the shaft 22' after a desired alignment of the shaft end portion 26' is achieved using the initial friction fit.

In an embodiment, the engaging component further comprises a shoulder 352 provided at a trailing location along the shaft portion 26' of the shaft 22' which comes into contact with a rim of the bore 300 upon a complete insertion of the shaft 22' into the bore 300. The contact registers the longitudinal placement of the shaft 22' relative to the backing plate 14*a*' so as to achieve a consistent lock-connection 206.

Upon completion of the locked connection 206, the engagement between the backing plate 14*a*' and the end portion 26' of the shaft 22' becomes locked against the effects of vibration, heat and torques typically imposed upon the connection 206 during a braking action, especially those effects tending to rotate the component 208 out of a full and secure engagement.

Figure 17:
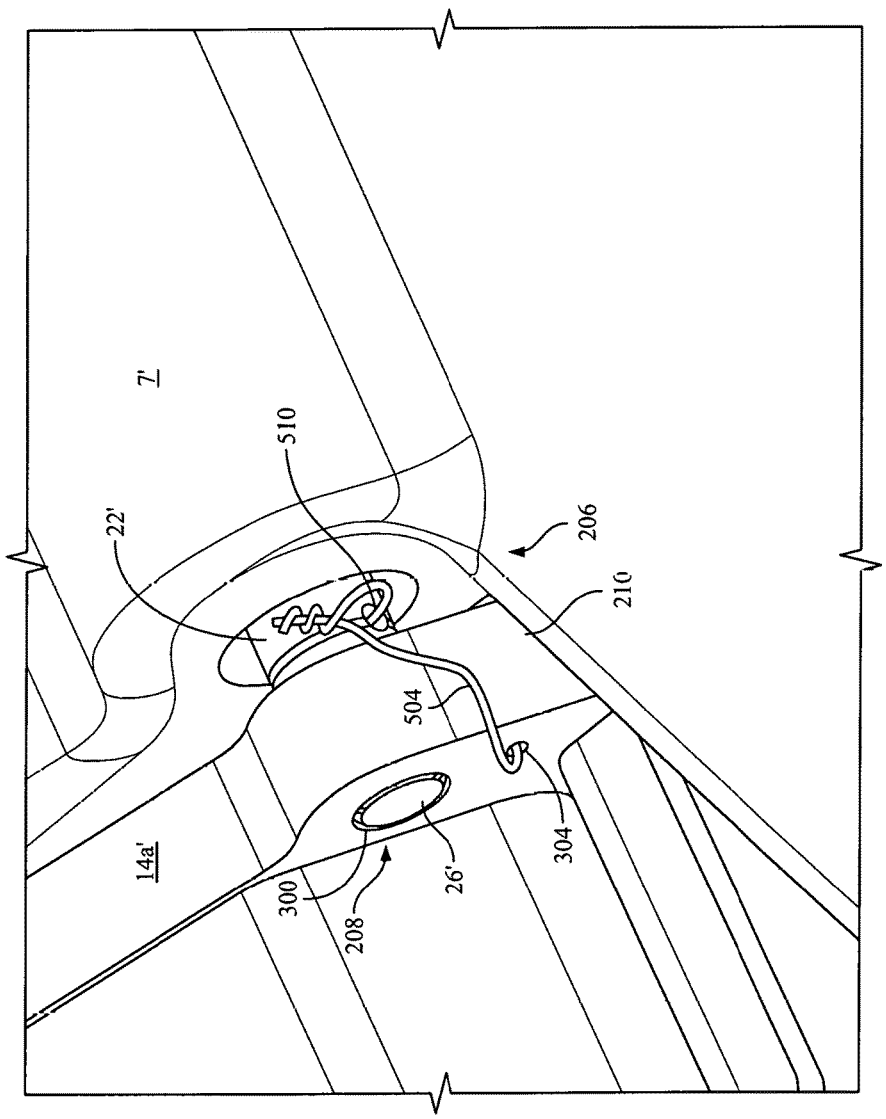
FIG. 17 is a perspective view of the caliper housing and backing plate illustrated within the inset B in FIG. 16 and having a lock-connection in accordance with a eighth embodiment including a locking wire.

Referring now to FIG. 17, in another embodiment, a lock-connection 206 between the backing plate 14*a*' and the shaft 22' comprises an engaging component 208 preferably in the form of a fit between a threaded bore 300 provided in the backing plate 14*a*' and a mating end portion 26' of the shaft 22' and a locking component 210 in the form of a locking (safety) wire 504 directed through a transverse channel 510 provided in the shaft 22' and through a second bore 304 provided in the backing plate 14*a*' adjacent the bore 300. Preferably, the fit between the shaft end portion 26' and the bore 300 is threaded. The transverse channel 510 is preferably located adjacent but spaced from the trailing portion 26' of the shaft 22' such that it locates in a space between the backing plate 14*a*' and the housing 7'. In an embodiment, opposite ends of the safety wire are directed through the channel 510 and the second bore 304 and then wound together to remove slack and to produce a desired amount of tension in the locking wire 504. Preferably, the routing of the wire 504 through and about the shaft 22' at and about the transverse channel 510 is such that upon winding (tightening) of the locking wire 504, tension in the wire 504 is in a direction tending to tighten the threaded connection between the threaded bore 300 of the backing plate 14*a*' and the threaded end portion 26' of the shaft 22'.

Upon tightening of the locking wire 504, a lock-connection 206 is established which is counteractive against the effects of vibration, heat and torques typically imposed upon the connection 206 during a braking action, especially those effects tending to rotate the engaging component 208 out of a full and secure engagement.

Although it is preferred that the engaging component 208 of this embodiment comprises a standard threaded fit, it may comprise instead or in addition a lock threading, a press fit or other manner of engagement.

It is contemplated that the locking component 210 of this embodiment could be used in lieu of or in addition to the respective locking components 210 of any of the preceding embodiments.

Stop Ring

Figure 9:
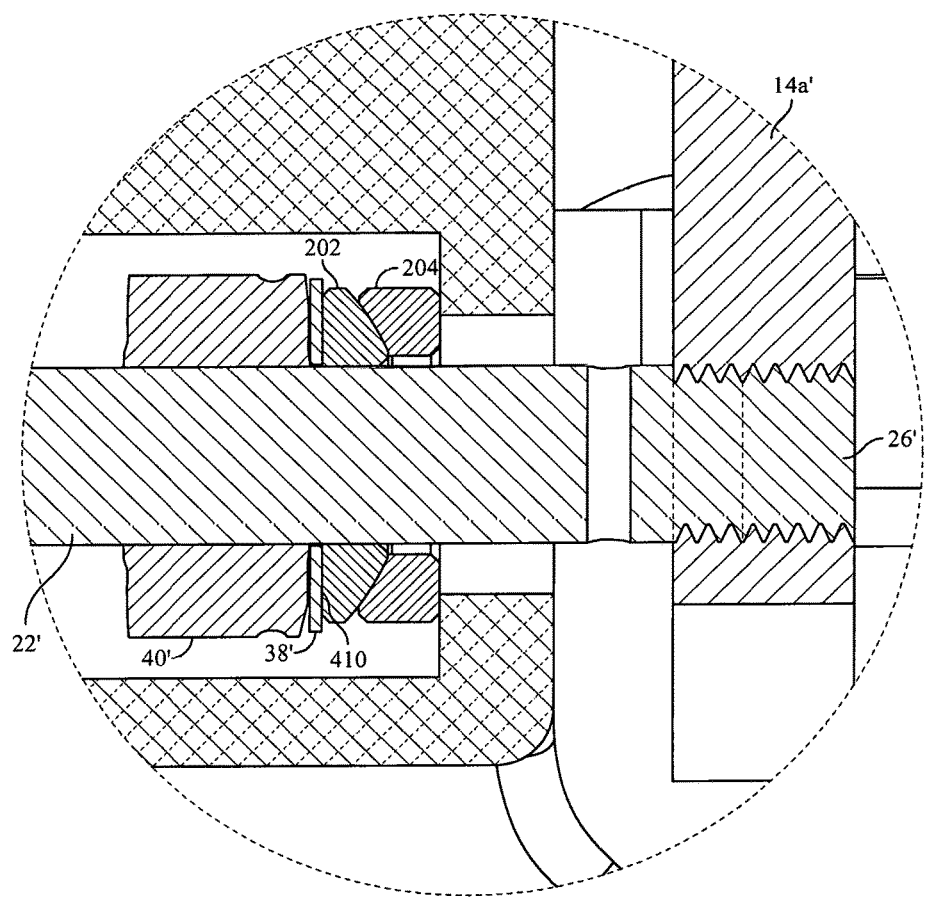
FIG. 9 is a side, cross-sectional view of the caliper housing and backing plate illustrated in FIG. 8A, but with its resilient member in a compressed state.

Referring now to FIGS. 8A and 9, an embodiment includes at least one stop ring interposed between the spring 38 and the rim portion 37 of the housing 7'. Preferably a first ring 202 and a second ring 204 is provided between the spring and the housing rim portion 37 so as to establish a stop with respect to deflection (displacement) of the spring 38'. Upon operation of the reacting member 9*a*' to extend the brake pad 12*a*', the caliper retraction collar 30' is urged against and deflects (displaces) the spring 38' toward the first ring 202 such that the spring 38' may come into a surface to surface contact against at least portions of an annular surface 410 of the first ring 202. Preferably, the annular surface 410 of the first ring 202 is orthogonal relative to the shaft 22', such that upon full deflection of the spring 38', the spring assumes a more orthogonal relation with respect to the shaft 22'.

Preferably, the first ring 202 is slidingly fitted upon the shaft 22' such that it does not impede the sliding movement of the shaft 22' relative to the retraction collar 30' as described previously. Preferably, the second ring 204 is disposed about the shaft 22' with clearance and an outer portion of the second ring 204 abuts the housing rim portion 37.

The first and second rings 202 and 204 are mutually interfaced about frusto-conical surfaces 420, 422 such that compression of the first and second rings 202, 204 by the spring 38' centers the second ring 204 concentrically about the bolt shaft 22', with clearance.

Advantageously, the first ring 202 may come in sets for selection and placement of a particular ring 202 on the shaft 22' according to a desired degree of deflection and/or size of the spring 38'. For example, a first ring 202 may be provided with a conical surface 410 which limits the deflection of the spring 38' by an amount less than a ring 202 having orthogonal annular surface 410. Also, a particular ring 202 may be sized radially to accommodate a larger or smaller Belleville spring 38'.

In addition, the surface to surface contact of the first ring 202 with the shaft 22' and the surface to surface contact of the second ring 202 with the housing portion 37 can help distribute loads, torques and vibrations that arise during braking operations. The first and second rings also allow the shaft 22' to angularly shift in instances when operation of the brake may cause the orientation of the brake pad 12a' and its backing plate 14a' to skew momentarily. During such shifting, the first and second rings 202, 204 continue to provide a stop to spring movement as previously described while also alleviating (distributing) loads and bending moments upon the shaft 22' as a result of the shifting. The radial clearance between the second ring 204 and the shaft 22' also accommodates relative movement between the two during such shifting. The surface-to-surface contact between the first ring 202 and the shaft 22' helps distribute loads along the shaft 22'.

The invention has been described in detail with particular reference to certain preferred embodiments thereof, but it will be understood that variations and modifications can be effected within the spirit and scope of the invention.

What is claimed is:

1. A brake pad useable with a brake pad retraction system, said brake pad comprising:
   frictional material affixed to a backing plate, the backing plate comprising a locking connection operative between said brake pad and an end portion of a controller shaft, said locking connection comprising an engaging component operative to establish an alignment of the shaft with respect to said brake pad and a locking component operative to lock the shaft in said alignment, whereby said locking connection is counteractive to vibration, heat and/or torque arising from braking operation,
   wherein said locking wire includes a wound portion, said wound portion establishing a tension in said locking wire, said locking wire disposed about said shaft at said transfer channel so that said tension is in a direction of a tightening of said threaded fit.

2. The brake pad of claim 1, wherein said shaft includes a transverse channel adjacent said shaft end portion and said backing plate including a second bore adjacent said threaded bore, said locking wire extending through said channel and said second bore.

3. The brake pad of claim 2, wherein said locking wire includes a wound portion, said wound portion establishing a tension in said locking wire, said locking wire disposed about said shaft at a transfer channel so that said tension is in a direction of a tightening of said threaded fit.

4. A brake assembly comprising:
   a brake pad comprising frictional material affixed to a backing plate;
   a brake pad controller comprising a controller shaft having an end portion; and
   a locking connection operative between said brake pad and said end portion of said controller shaft, said locking connection comprising an engaging component operative to establish an alignment of said shaft with said brake pad and a locking component operative to lock the shaft in said alignment, whereby said locking connection is counteractive to vibration, heat and/or torque arising from braking operation,
   wherein said engaging portion comprises a fit between a bore provide in said backing plate and the shaft end portion, and said locking component comprises a locking wire.

5. The brake pad of claim 4, wherein said shaft includes a transverse channel adjacent said shaft end portion and said backing plate including a second bore adjacent said threaded bore, said locking wire extending through said channel and said second bore.

6. The brake pad of claim 5, wherein said locking wire includes a wound portion, said wound portion establishing a tension in said locking wire, said locking wire disposed about said shaft at said transverse channel so that said tension is in a direction of a tightening of said threaded fit.

* * * * *